(12) United States Patent
Cho et al.

(10) Patent No.: US 8,310,987 B2
(45) Date of Patent: Nov. 13, 2012

(54) APPARATUS AND METHOD FOR NOTIFYING CHANGE OF SYSTEM CONTROL INFORMATION IN A BROADBAND WIRELESS COMMUNICATION SYSTEM

(75) Inventors: Young-Bo Cho, Seongnam-si (KR); Mi-Hyun Lee, Seongnam-si (KR); Seong-Hyeon Chae, Seongnam-si (KR); Hee-Won Kang, Seongnam-si (KR); Young-Bin Chang, Anyang-si (KR); Ki-Chun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 602 days.

(21) Appl. No.: 12/497,309

(22) Filed: Jul. 2, 2009

(65) Prior Publication Data
US 2010/0002631 A1    Jan. 7, 2010

(30) Foreign Application Priority Data

Jul. 3, 2008   (KR) .................. 10-2008-0064336
Mar. 10, 2009  (KR) .................. 10-2009-0020037
Jul. 1, 2009   (KR) .................. 10-2009-0059732

(51) Int. Cl.
*H04W 4/00* (2009.01)

(52) U.S. Cl. ......... 370/328; 370/324; 370/326; 370/310

(58) Field of Classification Search .................. 370/389, 370/399, 474, 503, 395.4; 455/145, 185.1, 455/422.1, 455.01, 567, 450, 414.3, 466, 455/566; 375/211, 222, 372, 295
See application file for complete search history.

(56) References Cited

U.S. PATENT DOCUMENTS

| | | | |
|---|---|---|---|
| 2002/0006190 A1* | 1/2002 | Peeters et al. | 379/242 |
| 2003/0202541 A1* | 10/2003 | Lim et al. | 370/503 |
| 2007/0237107 A1* | 10/2007 | Jang et al. | 370/315 |
| 2008/0019349 A1 | 1/2008 | Moon | |
| 2008/0162742 A1* | 7/2008 | Kong et al. | 710/19 |
| 2009/0103569 A1* | 4/2009 | Cho et al. | 370/498 |
| 2009/0285096 A1* | 11/2009 | Yousef | 370/235 |

FOREIGN PATENT DOCUMENTS

KR  10-2005-0028737 A  3/2005

\* cited by examiner

*Primary Examiner* — Hassan Phillips
*Assistant Examiner* — Anez Ebrahim
(74) *Attorney, Agent, or Firm* — Jefferson IP Law, LLP

(57) ABSTRACT

An apparatus and method for notifying a change of system control information in a wireless communication system are provided. The method includes, changing a Group Configuration Change Counter (GCCC) and upon change of a Secondary-Super Frame Header/Sub-Packet1 (S-SFH/SP1) whose transmission period is changeable within a range of one or more super frames, changing the GCCC and information representing the change of the common control message upon change of at least one common control message, and transmitting the GCCC and the information representing the change of the at least one common control message.

34 Claims, 23 Drawing Sheets

APPARATUS AND METHOD FOR NOTIFYING CHANGE OF SYSTEM CONTROL INFORMATION IN A BROADBAND WIRELESS COMMUNICATION SYSTEM

PRIORITY

The present application claims the benefit under 35 U.S.C. §119(a) of a Korean patent application filed in the Korean Intellectual Property Office on Jul. 3, 2008 and assigned Serial No. 10-2008-0064336, a Korean patent application filed in the Korean Intellectual Property Office on Mar. 10, 2009 and assigned Serial No. 10-2009-0020037 and a Korean patent application filed in the Korean Intellectual Property Office on Jul. 1, 2009 and assigned Serial No. 10-2009-0059732 the entire disclosures of each of which are hereby incorporated by reference.

BACKGROUND OF THE INVENTION

1. Field of the Invention

The present invention relates to a broadband wireless communication system. More particularly, the present invention relates to an apparatus and method for notifying of a change or non-change of system control information in a broadband wireless communication system.

2. Description of the Related Art

A mobile communication system is evolving beyond a voice-centric communication system to provide a variety of services such as broadcasting, a multimedia video, a multimedia message, etc. Examples of this next generation communication system include an Institute of Electrical and Electronics Engineers (IEEE) 802.16e system, a $3^{rd}$ Generation Partnership Project (3GPP) Long Term Evolution (LTE) system, an IEEE 802.20 system, an Ultra Mobile Broadband (UMB) system, and an IEEE 802.16m system, etc.

To support a high data transmission speed in the next generation mobile communication system, a variety of transmission techniques such as the use of a multiple antenna system, Hybrid Automatic Repeat reQuest (HARQ), Adaptive Modulation and Coding (AMC), etc. are being introduced. In order for these transmission techniques to be managed, a Base Station (BS) has to transmit a significant amount of system control information to a plurality of user Mobile Stations (MSs). The system control information includes network and cell information that a user MS has to be aware of to perform mobile communication within a cell, for example, bandwidth information of the cell, configuration information of a physical channel, information of a parameter, etc. of an upper layer, etc., and information on a variety of transmission techniques supported in the cell, for example, number of transmit antennas, information on a multiple antenna, HARQ related information, modulation scheme information, etc.

In order for an MS to determine validity of stored system control information, a change counter for the system control information is transmitted. That is, if a change counter is received from a BS, an MS performs a comparison with a change counter that the MS itself knows. If the comparison result is that the known change counter is the same as the received change counter, the MS determines that system control information previously received and stored is valid. On the other hand, if the known change counter and the received change counter are different from each other, the MS receives new system control information. As a result, the MS may avoid attempting to decode repeated system control information.

However, because system control information includes information related to a system, it is rare that the system control information is changed while service is being provided. Thus, it is inefficient to transmit an information bit, i.e, a change counter for informing of change or non-change every frame in order to inform of a change of the system control information. In addition, the system control information includes information used for data transmission/reception, and includes information for supplementary service such as broadcasting related information, etc. Therefore, each item of information is different during the time required to update significance and information, etc. Thus, there is a need for an alternative for, by efficiently designing a transmission/reception scheme of system control information, solving the aforementioned problems and increasing system capacity in a next-generation wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for reducing overhead caused by a change counter used for informing of a change of system control information in a broadband wireless communication system.

Another aspect of the present invention is to provide an apparatus and method for stepwise determining of a change or non-change of system control information in a broadband wireless communication system.

A further aspect of the present invention is to provide an apparatus and method for determining an approximate change or non-change of system control information by using a Group Configuration Change Counter (GCCC) that is representative of a plurality of common control messages in a broadband wireless communication system.

Yet another aspect of the present invention is to provide an apparatus and method for determining of a change or non-change of each common control message by using a change counter corresponding to each of a plurality of common control messages in a broadband wireless communication system.

A still another aspect of the present invention is to provide an apparatus and method for transmitting/receiving, through a common control channel, a change counter corresponding to each of a plurality of common control messages in a broadband wireless communication system.

Still another aspect of the present invention is to provide an apparatus and method for transmitting/receiving, through a map region, a change counter corresponding to each of a plurality of common control messages in a broadband wireless communication system.

Another aspect of the present invention is to provide an apparatus and method for transmitting/receiving, through a data region, a change counter corresponding to each of a plurality of common control messages in a broadband wireless communication system.

The above aspects are addressed by providing an apparatus and method for notifying of a change of system control information in a broadband wireless communication system.

In accordance with an aspect of the present invention, an operation method of a Base Station (BS) in a broadband wireless communication system is provided. The method includes, changing a Group Configuration Change Counter (GCCC) upon change of a Secondary-Super Frame Header/Sub-Packet1 (S-SFH/SP1) whose transmission period is changeable within a range of one or more super frames, changing the GCCC and information representing the change of the common control message upon change of at least one common control message, and transmitting the GCCC and the information representing the change of the at least one common control message.

In accordance with another aspect of the present invention, an operation method of an MS in a broadband wireless communication system is provided. The method includes determining a change or non-change of an S-SFH/SP1 whose transmission period is changeable within a range of one or more super frames and at least one of common control messages using a GCCC received from a BS, determining a change or non-change of at least one of the common control messages using information representing a change of at least one common control message when the GCCC increases, and updating the at least one common control message when at least one of the common control messages is changed.

In accordance with a further aspect of the present invention, a BS apparatus in a broadband wireless communication system is provided. The apparatus includes a manager and a transmitter. The manager changes a GCCC upon change of an S-SFH/SP1 whose transmission period is changeable within a range of one or more super frames and changes the GCCC and information representing the change of the common control message upon change of at least one common control message. The transmitter transmits the GCCC and the information representing the change of the at least one common control message.

In accordance with yet another aspect of the present invention, an MS apparatus in a broadband wireless communication system is provided. The apparatus includes a controller and a manager. The controller determines a change or non-change of an S-SFH/SP1 whose transmission period is changeable within a range of one or more super frames and at least one of common control messages using a GCCC received from a BS and determines a change or non-change of at least one of the common control messages using information representing a change of at least one common control message when the GCCC is changed. The manager updates at least one common control message when at least one of the common control messages is changed.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description when taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, can occur in amounts that do not preclude the effect the characteristic was intended to provide.

Exemplary embodiments of the present invention will be described herein below with reference to the accompanying drawings. In the following description, well-known functions and constructions are not described in detail since they would obscure the invention in unnecessary detail.

A technology for efficiently determining a change or non-change of system control information in a broadband wireless communication system according to exemplary embodiments of the present invention is described below. Exemplary embodiment of the present invention describe, for example, a wireless communication system of an Orthogonal Frequency Division Multiplexing/Orthogonal Frequency Division Multiple Access (OFDM/OFDMA) scheme, and is equally applicable to a wireless communication system of a different scheme.

Figure 1:
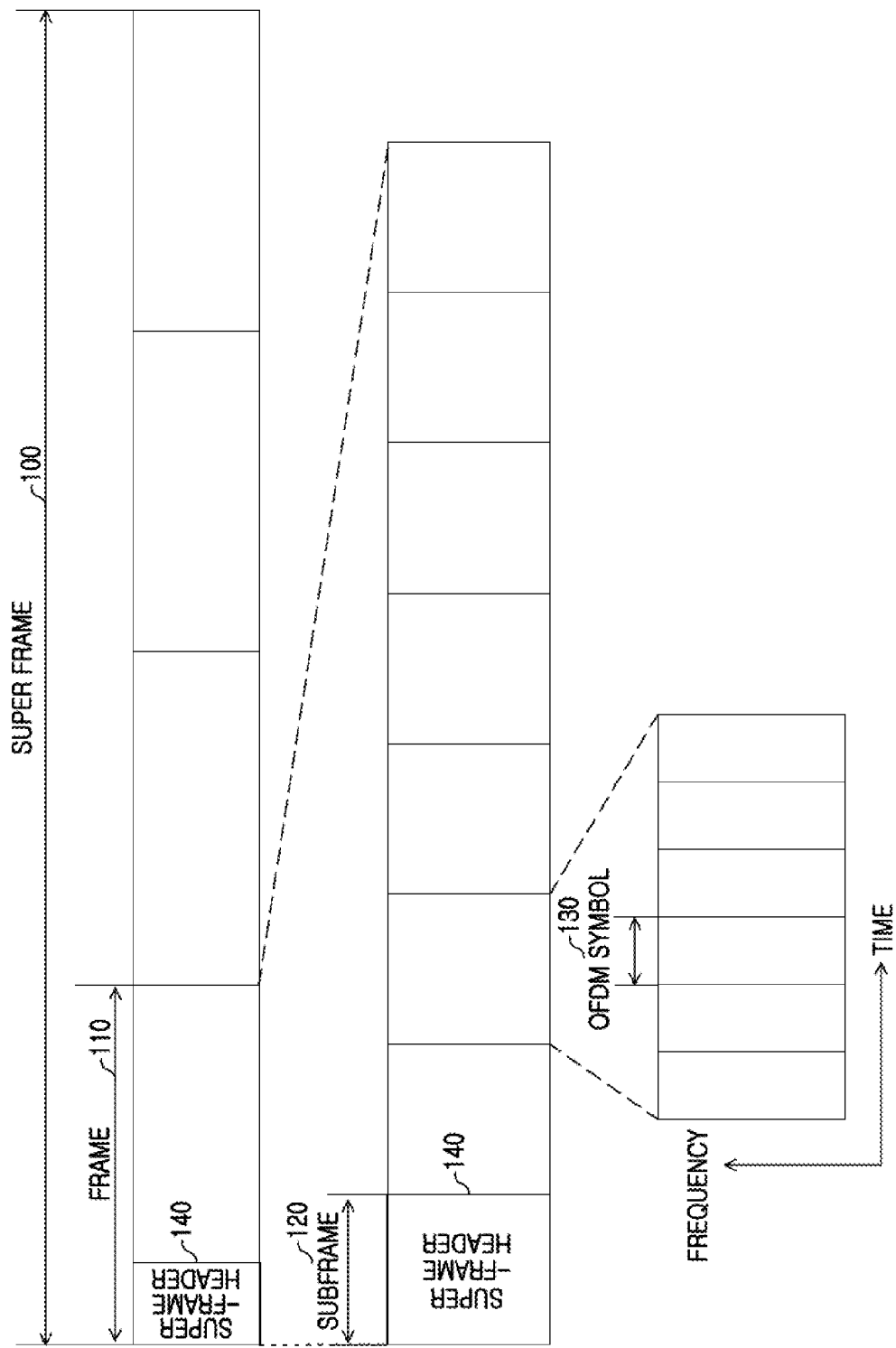
FIG. 1 is a diagram illustrating an example of a frame structure in a broadband wireless communication system according to an exemplary embodiment of the present invention.

FIG. 1 illustrates an example of a frame structure in a broadband wireless communication system according to an exemplary embodiment of the present invention.

Referring to FIG. 1, a super frame 100 is divided into a plurality of frames 110, and the frame 110 is divided into subframes 120 that are each comprised of a plurality of OFDM symbols 130. In the super frame 100, a first subframe of a first frame is a super-frame header 140. The super-frame header 140 includes a synchronization channel, a common control channel, etc. The super-frame header 140 is a region for transmitting system control information required for a Mobile Station (MS) to perform communication with a corresponding Base Station (BS). Among the system control information, system control information changed every super frame unit such as a Super-Frame Number (SFN) applies a fixed coding technique, and is transmitted through a defined resource within the super-frame header 140. On the other hand, on the assumption that an MS may combine signals received several times, system control information having no change during a long time is repeatedly transmitted. Thus, compared to the system control information changed every super frame unit, the system control information having no change during a long time period may be transmitted with a relatively large amount of information through the same bandwidth. The system control information is transmitted through a Primary-Super Frame Header (P-SFH) or a Secondary-Super Frame Header/Sub-Packet1 (S-SFH/SP1) depending on significance, changeability, and transmission period.

For example, the S-SFH/SP1 includes information transmitted in a period of one or more super frame units. The P-SFH and the S-SFH/SP1 include an initial network entry, a network re-entry, and a basic parameter of a system for communication between an MS and a BS and control information. In more detail, the P-SFH includes at least one of Least Significant Bits (LSBs) of an SFN, a Group Configuration Change Counter (GCCC), information on a transmission format and size of an S-SFH/SP1, etc. The S-SFH/SP1 includes at least one of Most Significant Bits (MSBs) of an SFN, an SP change counter, scheduling information of an S-SFH/SPx, and information for handover. The P-SFH is transmitted every super frame, and a size and position of a resource for transmission and a Modulation and Coding Scheme (MCS) level applied are fixed. However, the S-SFH/SP1 may change in transmission scheme and resource size. Information on the transmission scheme and size of the S-SFH/SP1 is forwarded through the P-SFH. In addition, remaining system information not included in the S-SFH/SP1 is transmitted through a separate message. Here, the S-SFH/SPx represents a remainder not including the S-SFH/SP1 from among SPs of an S-SFH.

Figure 2A:
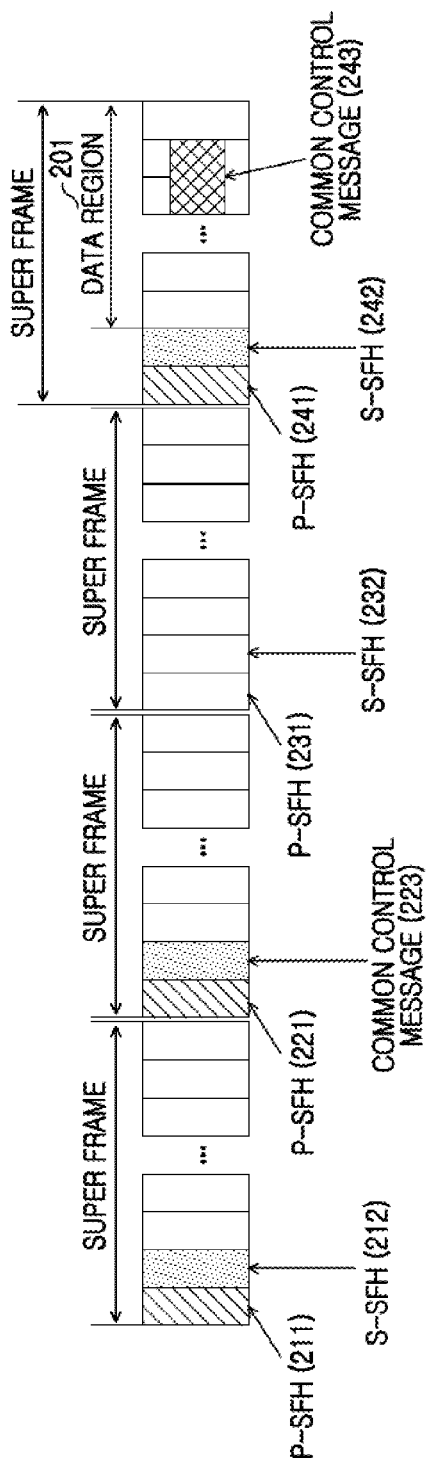
FIGS. 2A and 2B are diagrams illustrating examples of transmission of system control information in a broadband wireless communication system according to exemplary embodiments of the present invention.
Figure 2B:
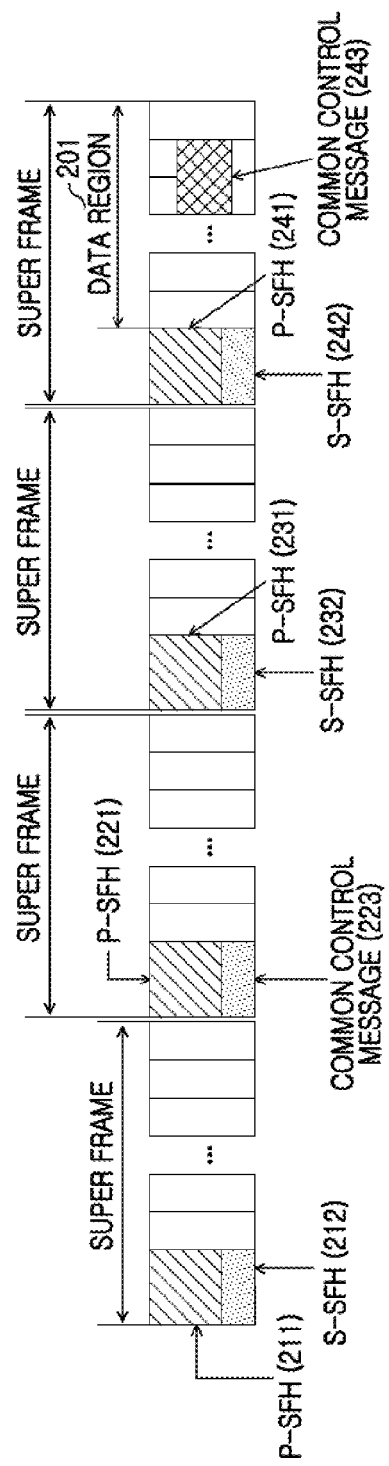

FIGS. 2A and 2B illustrate examples of transmission of system control information in a broadband wireless communication system according to exemplary embodiments of the present invention.

Referring to FIGS. 2A and 2B, system control information is transmitted through P-SFHs 211, 221, 231, and 241, S-SFH/SP1s 212, 232, and 242, and common control messages 223 and 243. The P-SFHs 211, 221, 231, and 241 are transmitted every super frame. The S-SFH/SP1s 212, 232, and 242 and the common control messages 223 and 243 are transmitted at an interval of one or more super frames. As illustrated in FIG. 2A, the common control messages 223 and 243 may be transmitted through a data region 201 or may be transmitted at a first subframe of a super frame. As illustrated in FIG. 2A, the P-SFHs 211, 221, 231, and 241 and the S-SFH/SP1s 212, 232, and 242 may be transmitted in a form of Time Division Multiplexing (TDM) or, as in FIG. 2B, may be transmitted in a form of Frequency Division Multiplexing (FDM).

Figure 3A:
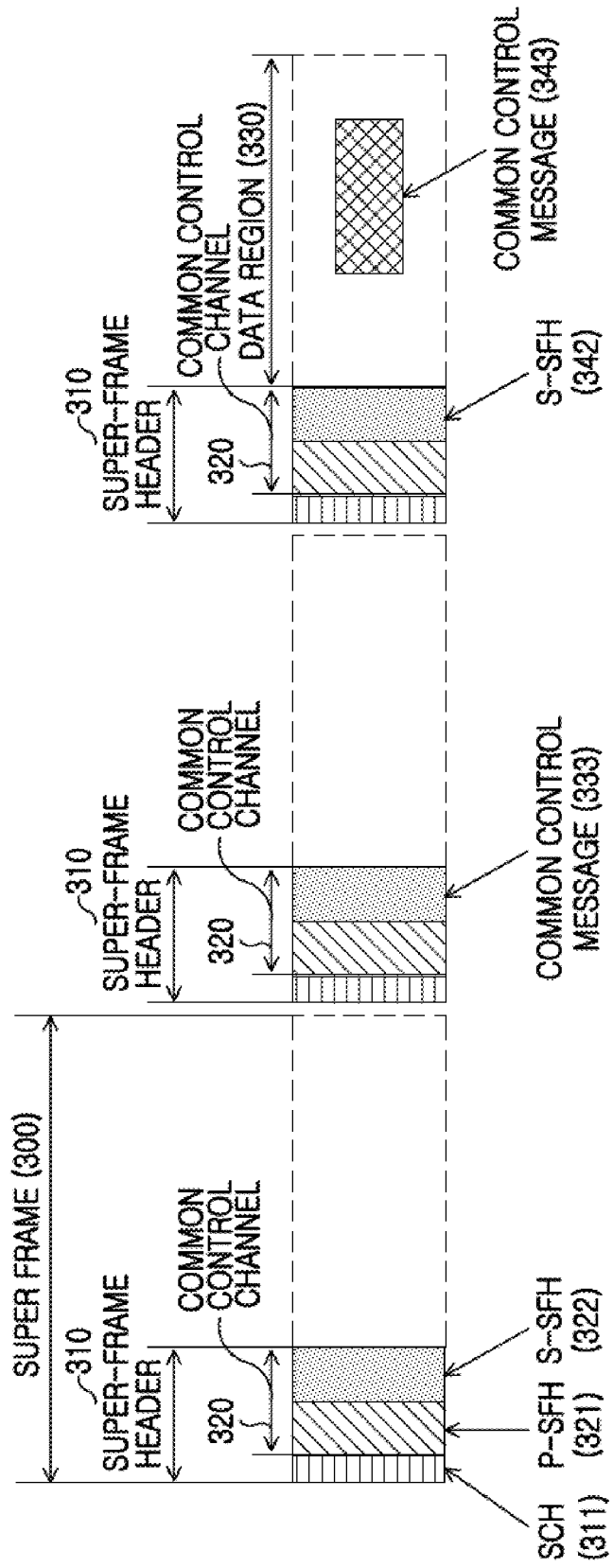
FIGS. 3A and 3B are diagrams illustrating examples of transmission of a Primary-Super Frame Header (P-SFH), a Secondary-Super Frame Header/Sub-Packet1 (S-SFH/SP1), and a common control message while operating a super-frame header in a broadband wireless communication system according to exemplary embodiments of the present invention.
Figure 3B:
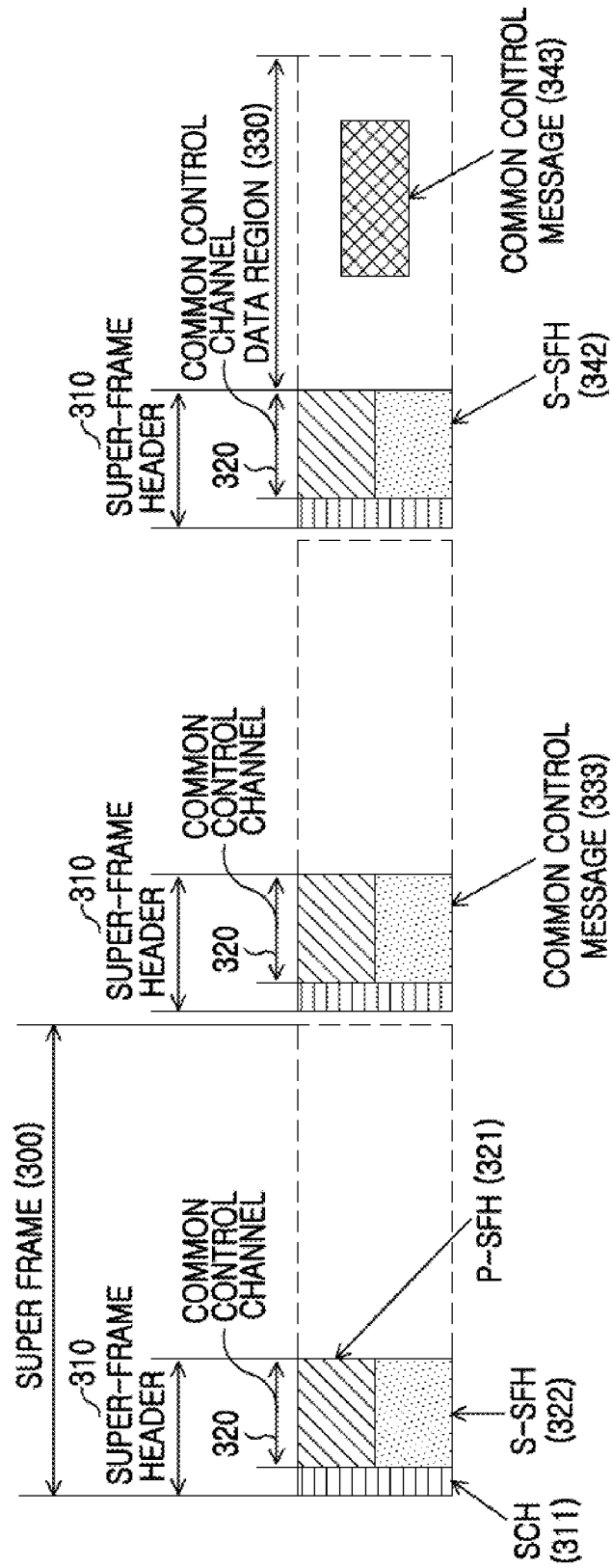

FIGS. 3A and 3B illustrate examples of transmission of a P-SFH, an S-SFH/SP1, and a common control message while operating a super-frame header in a broadband wireless communication system according to exemplary embodiments of the present invention.

Referring to FIGS. 3A and 3B, a P-SFH 321 is transmitted through a common control channel 320. Because the P-SFH 321 includes information required when an MS performs an initial network entry, the P-SFH 321 is transmitted always through a predefined resource region, and applies a predefined MCS level. Therefore, a first frame of a super frame 300, which is a super-frame header 310, includes a synchronization channel (SCH) 311 for synchronization and the common control channel 320. The P-SFH 321 is transmitted through a limited resource region within the super-frame header 310. Because the P-SFH 321 should be able to be stably decoded by all MSs, the P-SFH 321 applies a fixed low MCS level, and is transmitted through a resource of a defined position. S-SFH/SP1s 322 and 342 are also transmitted through super-frame headers 310, and their transmission periods and message sizes may be different depending on an intention of a person who practices the present invention. Remaining system control information other than system control information included in the P-SFH 321 and the S-SFH/SP1s 322 and 342 are transmitted through the common control messages 333 and 343. The common control message 333 or 343 may be transmitted through a super-frame header 310 or a data region 330. That is, if the S-SFH/SP1s 322 and 342 are transmitted in a long period, the common control message 333 may be transmitted through the super-frame header 310 not including the S-SFH/SP1s 322 and 342. FIG. 3A illustrates the P-SFH and the S-SFH/SP1 transmitted in a TDM form. However, as in FIG. 3B, the P-SFH 321 and the S-SFH/SP1 322 and 342 may be transmitted in an FDM form at one subframe.

In addition, in a broadband wireless communication system according to exemplary embodiments of the present invention, a BS transmits a change counter for informing of a change or non-change of a common control message. In an exemplary embodiment of the present invention, the change counter is transmitted through one of an S-SFH/SP1, a map, and a data burst.

In an exemplary embodiment of the present invention, information factors included in a common control message providing system configuration information are classified into a plurality of information groups. Here, a reference for distinguishing the information factors, which is transmission timing, a required transmission period, etc., is support or non-support of a power efficiency operation of an MS. Each information factor is transmitted through one of a fixed size channel and variable size channel. Here, the fixed size channel and the variable size channel are positioned within a fixed position or any subframe such as a first subframe. According to an exemplary embodiment of the present invention, the common control message is defined as one of a P-SFH message provided in the fixed size channel, an S-SFH/SP1 message provided in the variable size channel, and a separate common control message. Hereinafter, for convenience of description, in an exemplary embodiment of the present invention, the common control messages are limited to two messages, and are designated as an S-SFH/SP2 and an S-SFH/SP3. The P-SFH message has a fixed size and a fixed transmission period. The S-SFH/SP1, the S-SFH/SP2, and the S-SFH/SP3 have variable sizes and variable transmission periods. For example, the S-SFH/SP2 includes parameters influencing data communication and whose transmission periods are short. The S-SFH/SP3 includes information directly influencing data transmission/reception and whose transmission period is long. In one exemplary embodiment of the present invention, the common control message is classified into four information factors, but the common control message may be changed in number depending on an intention of a person who practices the present invention and system requirements. A construction described below is identically applicable irrespective of a number of common control messages and a transmission period and use of each common control message.

If an MS performs an initial network entry or re-entry, the MS decodes common control messages and then, stores information acquired from the common control message in a memory. To reduce power consumption and attempt quick access, the MS needs to identify if a common control message in use is valid. Thus, a BS has to inform all MSs of occurrence or non-occurrence of a change of parameters of common control messages in use. However, as described above, if a common control message is divided into a plurality of information factors, providing configuration change information by each information factor generates a significant amount of overhead. Thus, a GCCC is transmitted through a P-SFH included in every super frame.

Figure 4:
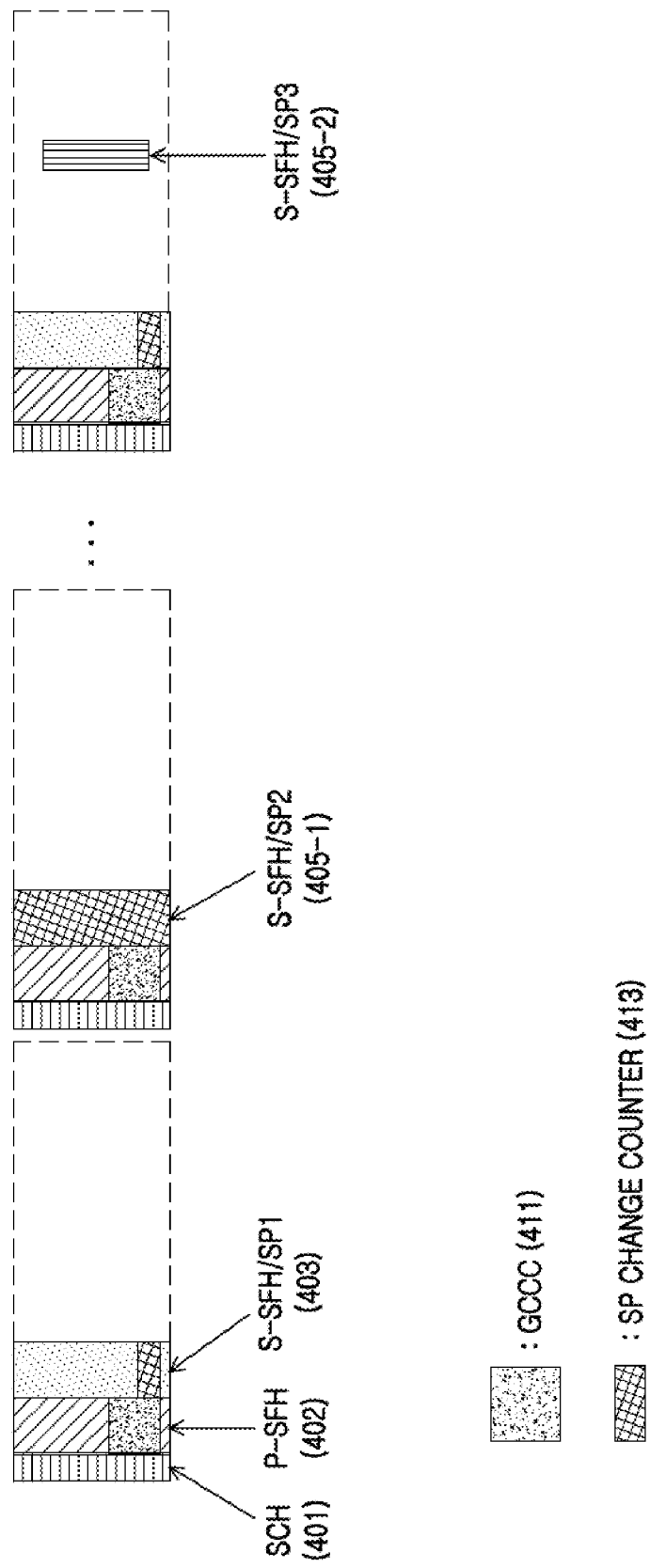
FIG. 4 is a diagram illustrating a change counter transmission format in a broadband wireless communication system according to a first exemplary embodiment of the present invention.

FIG. 4 illustrates a change counter transmission format in a broadband wireless communication system according to a first exemplary embodiment of the present invention. FIG. 4 illustrates that a change counter is transmitted through an S-SFH/SP1 message.

In the first exemplary embodiment of the present invention, a GCCC 411 is transmitted through a P-SFH 402 included in every super frame. An SCH 411 for synchronization is also included in every super frame. A change counter for each of an S-SFH/SP1 403 and a common control message is used to inform of a change or non-change of the S-SFH/SP1 403 and the common control message. The common control message is divided into an S-SFH/SP2 405-1 and an S-SFH/SP3 405-2. A reference for distinguishing the common control messages, which is a characteristic of information included, is the inclusion or non-inclusion of a required transmission period and a parameter influencing data transmission/reception, etc. In FIG. 4, the S-SFH/SP2 405-1 includes a parameter influencing data communication and having a short transmission period. The S-SFH/SP3 405-2 includes information directly influencing data transmission/reception and having a long transmission period. Thus, as illustrated in FIG. 4, the GCCC 411 is transmitted through the P-SFH 402 included in every super frame, and change counters of common control messages, i.e., an S-SFH/SP2 change counter and an S-SFH/SP3 change counter 413 are transmitted through the S-SFH/SP1 403.

In the first exemplary embodiment of the present invention, the change counter 413 of each common control message is included within the S-SFH/SP1 403 and thus, the GCCC 411 included in the P-SFH 402 is representative of a change of any of the common control messages. That is, the GCCC 411 is changed due to a change of the S-SFH/SP2 405-1, a change of the S-SFH/SP3 405-2, or a change of the S-SFH/SP1 403. That is, even when one of the common control messages is changed, the GCCC 411 is changed. Thus, an MS recognizing the change of the GCCC 411 determines a change or non-change of the S-SFH/SP2 405-1 and S-SFH/SP3 405-2 by decoding the S-SFH/SP1 403 and then reading the SP change counters 413. That is, it is recognized that there is a change of a common control message through the GCCC 411 within the P-SFH 402, and it is detected whether any common control message is changed through the S-SFH/SP1 403. However, the change counters for the common control messages of the S-SFH/SP2 405-1, the S-SFH/SP3 405-2, etc. are described to be the SP change counters introducing a concept of a counter, but the change counter may also be expressed using an indicator of a different form such as a bitmap, etc.

Figure 5:
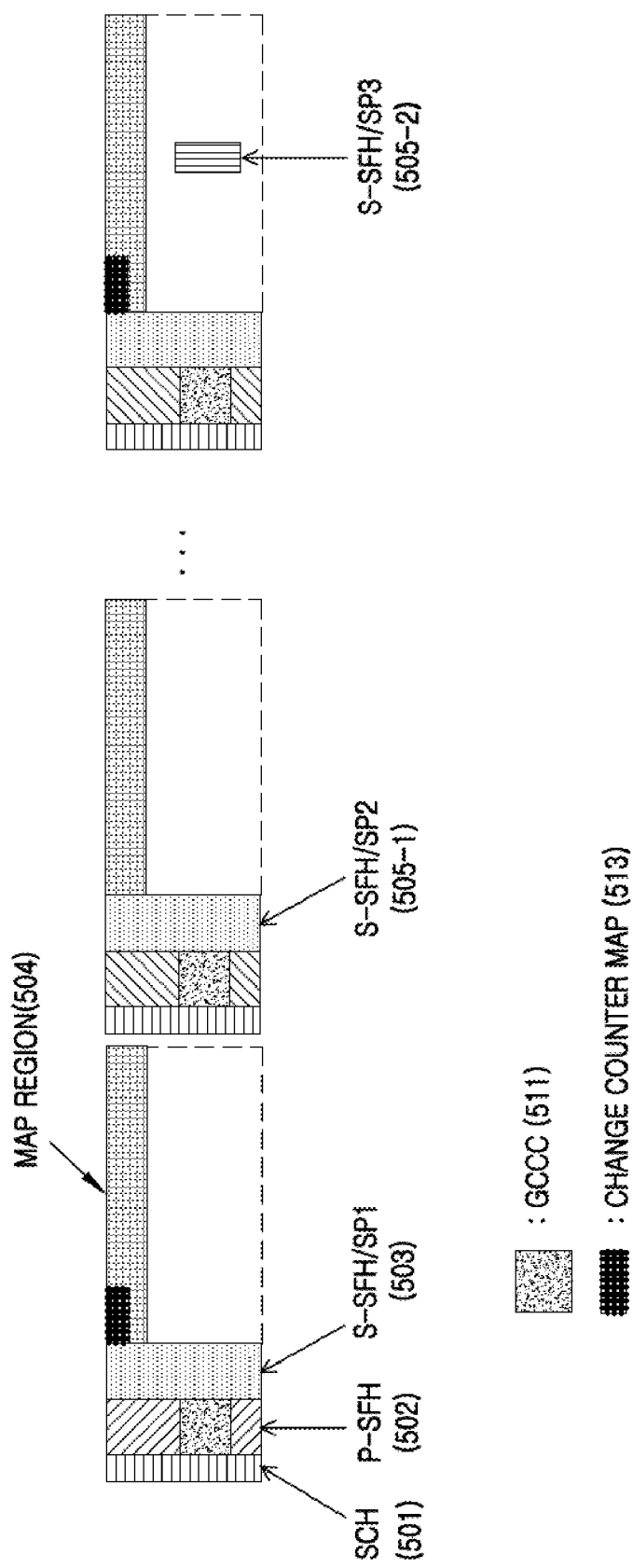
FIG. 5 is a diagram illustrating a change counter transmission format in a broadband wireless communication system according to a second exemplary embodiment of the present invention.

FIG. 5 illustrates a change counter transmission format in a broadband wireless communication system according to a second exemplary embodiment of the present invention. FIG. 5 illustrates that a change counter is transmitted through a map region.

In a super-frame header region, a resource is restricted and thus, an amount of information able to be transmitted is limited. If there are numerous common control messages to be transmitted, a resource for transmission of a common control message change counter may be restricted in a limited super-frame header region. Thus, in the second exemplary embodiment of the present invention, an SP change counter may be transmitted through a map region 504. That is, as illustrated in FIG. 5, a GCCC 511 is transmitted through a P-SFH 502 included in every super frame, and change counters of other common control messages, i.e., an S-SFH/SP2 change counter and an S-SFH/SP3 change counter are transmitted through the map region 504. An SCH 511 for synchronization is also included in every super frame.

In the second exemplary embodiment of the present invention, the GCCC 511 included in the P-SFH 502 is representative of change of any of the common control messages. That is, the GCCC 511 is changed due to a change of an S-SFH/SP2 505-1, a change of an S-SFH/SP3 505-2, or a change of an S-SFH/SP1 503. That is, when even one of the common control messages is changed, the GCCC 511 is changed. Thus, an MS recognizing the change of the GCCC 511 determines a change or non-change of the S-SFH/SP2 505-1 and S-SFH/SP3 505-2 by successfully decoding a map including the S-SFH/SP2 change counter and the S-SFH/SP3 change counter and then reading the S-SFH/SP2 change counter and the S-SFH/SP3 change counter.

The second exemplary embodiment of the present invention is different from the first exemplary embodiment of the present invention in that the SP change counter is not transmitted through the S-SFH/SP1 503 but the map region 504 instead. That is, the SP change counter is comprised of a downlink map, and is transmitted through the map region 504. A change counter map 513, which is a map including the SP change counter, applies a scrambling code particular to the change counter map 513 for the purpose of distinction from maps for different data transmission, or includes a parameter that identifies the counter map. Because a change of an S-SFH/SPx is generated in a very long period, it is inefficient to transmit the change counter map 513 every super frame. Thus, the change counter map 513 is transmitted periodically depending on a predefined time interval.

Figure 6:
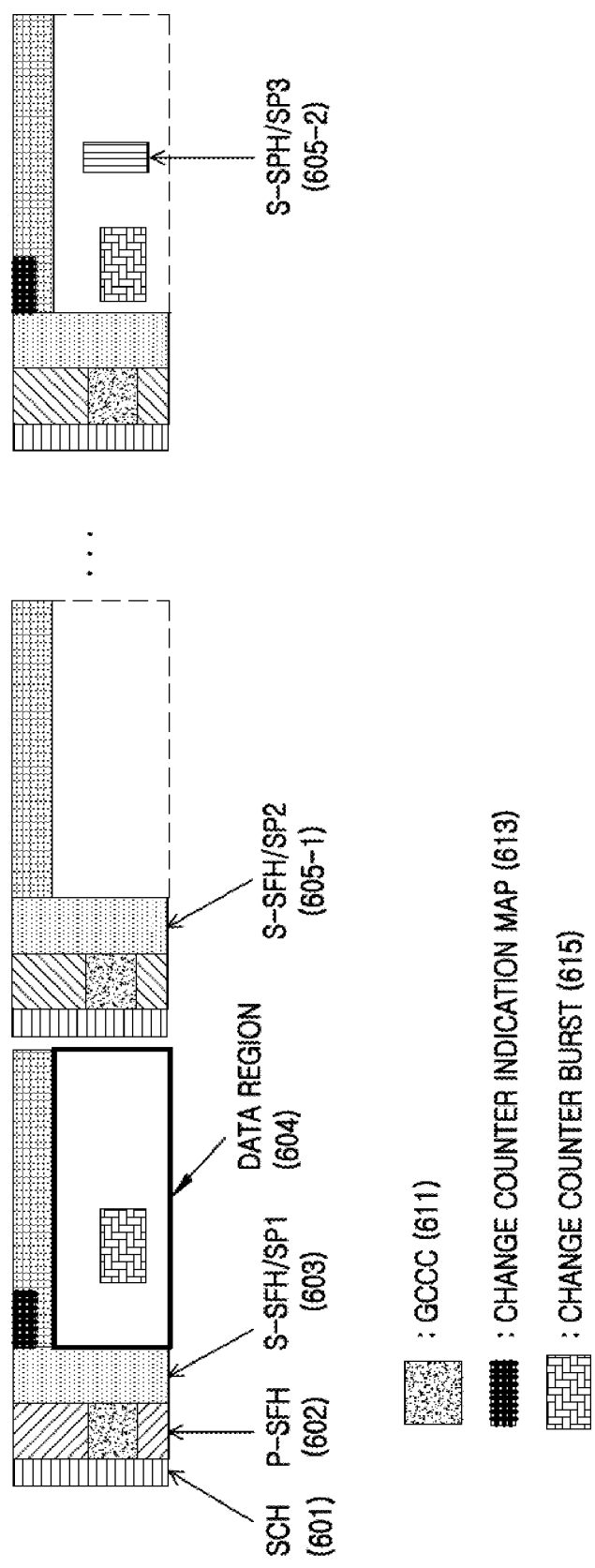
FIG. 6 is a diagram illustrating a change counter transmission format in a broadband wireless communication system according to a third exemplary embodiment of the present invention.

FIG. 6 illustrates a change counter transmission format in a broadband wireless communication system according to a third exemplary embodiment of the present invention. FIG. 6 illustrates that a change counter is transmitted through a data region.

In the third exemplary embodiment of the present invention, an SP change counter is transmitted through a data region 604. That is, as illustrated in FIG. 6, a GCCC 611 is transmitted through a P-SFH 602 included in every super frame, and change counters of other common control messages, i.e., an S-SFH/SP2 change counter and an S-SFH/SP3 change counter are transmitted through the data region 604. An SCH 611 for synchronization is also included in every super frame.

In the third exemplary embodiment of the present invention, the GCCC 611 transmitted through the P-SFH 602 is representative of a change of any of the common control messages. That is, the GCCC 611 is changed due to a change of an S-SFH/SP2 605-1, a change of an S-SFH/SP3 605-2, or a change of an S-SFH/SP1 603. That is, even when one of the common control messages is changed, the GCCC 611 is changed. Thus, an MS recognizing the change of the GCCC 611 determines a change or non-change of the S-SFH/SP2 605-1 and the S-SFH/SP3 605-2 by successfully decoding a data burst 615 including the S-SFH/SP2 change counter and the S-SFH/SP3 change counter and then reading the S-SFH/SP2 change counter and the S-SFH/SP3 change counter.

The third exemplary embodiment of the present invention is different from the second exemplary embodiment of the present invention in that the SP change counter is comprised of a data burst, and is transmitted through the data region 604. That is, the SP change counter is comprised of a downlink data burst, and is transmitted through the data region 604. Resource allocation information on a change counter burst 615 is informed through a map for general resource allocation. That is, a change counter indication map 613 indicating the change counter burst 615 exists. The change counter indication map 613 is of the same form as that of a map for general resource allocation. However, the change counter indication map 613 includes information identifying a burst as the change counter burst 615.

According to an exemplary embodiment of the present invention, a common control message is transmitted only at a specific super frame according to a predefined period. If an MS is in an idle mode or sleep mode, the MS determines if a paging signal reaches the MS by transiting to an awake mode for a period of time without transmission/reception with a BS and then receiving a common control channel. If it is recognized that the common control message is changed, the MS has to receive the common control message. However, the MS is not aware when the common control message is transmitted and thus, until actual reception, the MS has to keep decoding downlink map information and determine if allocation information of the common control message is included. In this case, there is a problem of unnecessarily consuming MS power. Therefore, if a common control message is transmitted in a specific period, an MS may obtain an offset up to a super frame where a next common control message is transmitted, and may reduce the consumption power of the MS by cutting off power consumption of the MS during the duration the common control message is not transmitted.

Figure 7:
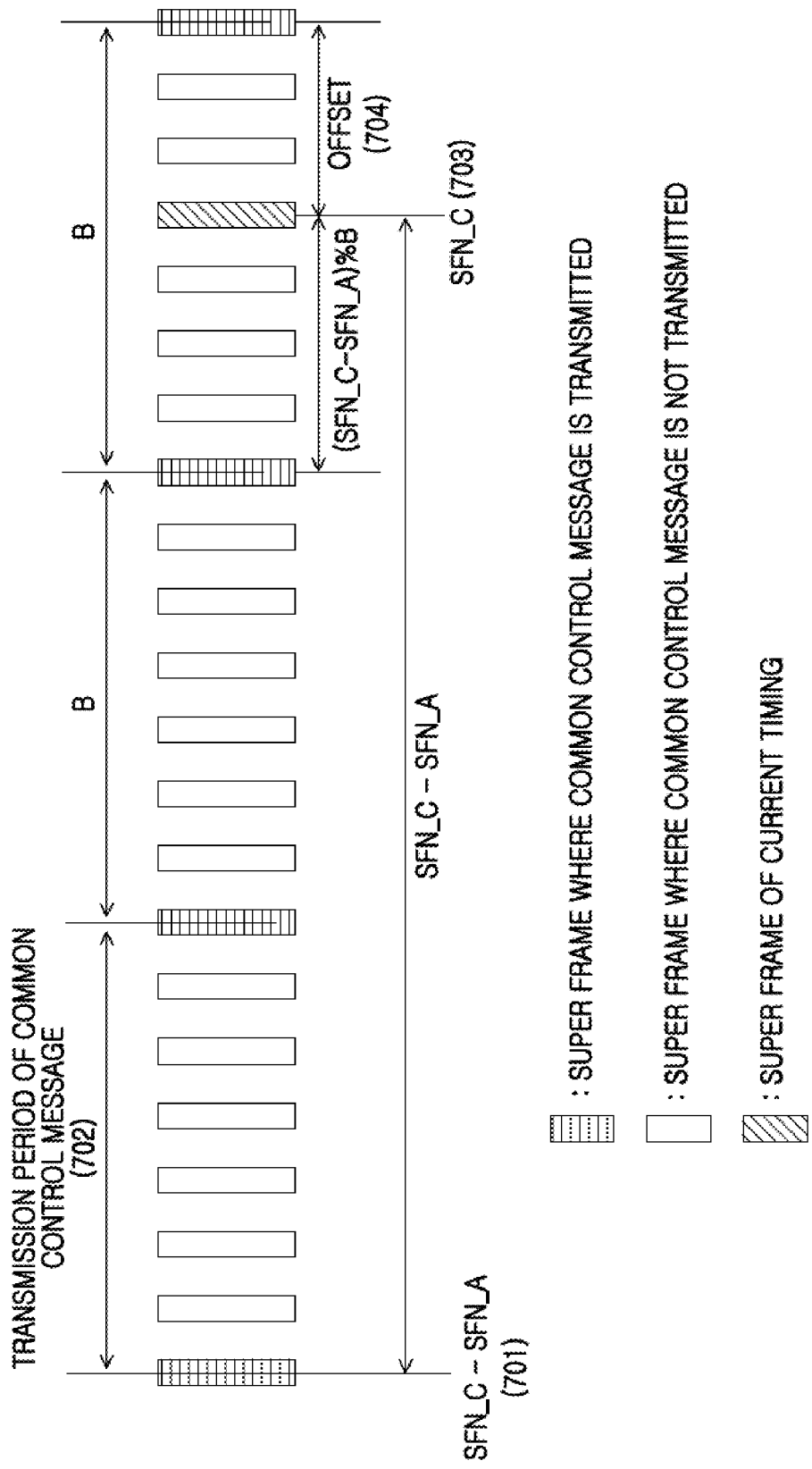
FIG. 7 is a diagram illustrating a correlation between a transmission period of a common control message and an offset of the common control message in a broadband wireless communication system according to an exemplary embodiment of the present invention.

FIG. 7 illustrates a correlation between a transmission period of a common control message and an offset of the common control message in a broadband wireless communication system according to an exemplary embodiment of the present invention.

Referring to FIG. 7, in order to calculate an offset 704 of a common control message, the following information is used: a super-frame number (SFN_A) 701 at the time for receiving a previous common control message, a transmission period (B) 702 of a common control message, a current super-frame number (SFN_C) 703, etc. As illustrated in FIG. 7, the offset 704 of the common control message is obtained by calculating a difference between the transmission period (B) 702 of the common control message and a remainder of a value of dividing, by the transmission period (B) 702 of the common control message, a difference between the current super-frame number (SFN_C) 703 and the super-frame number (SFN_A) 701 at the time for receiving the previous common control message. This is expressed as in Equation 1:

$$\text{Offset} = B - ((SFN\_C - SFN\_A) \% B) \qquad (1)$$

In Equation 1, the 'Offset' denotes an offset of a common control message, the 'B' denotes a transmission period of the common control message, the 'SFN_A' denotes a super-frame number at the time for receiving a previous common message, and the 'SFN_C' represents a current super-frame number.

An operation and construction of a BS and MS for transmitting/receiving a control message according to an exemplary embodiment of the present invention are described below with reference to the drawings. Herein, it is assumed that change counters have a form of a counter. However, according to an intention of a person who practices the present invention, the change counters may have a form that is different from the counter, for example, a form of a bitmap.

Figure 8:
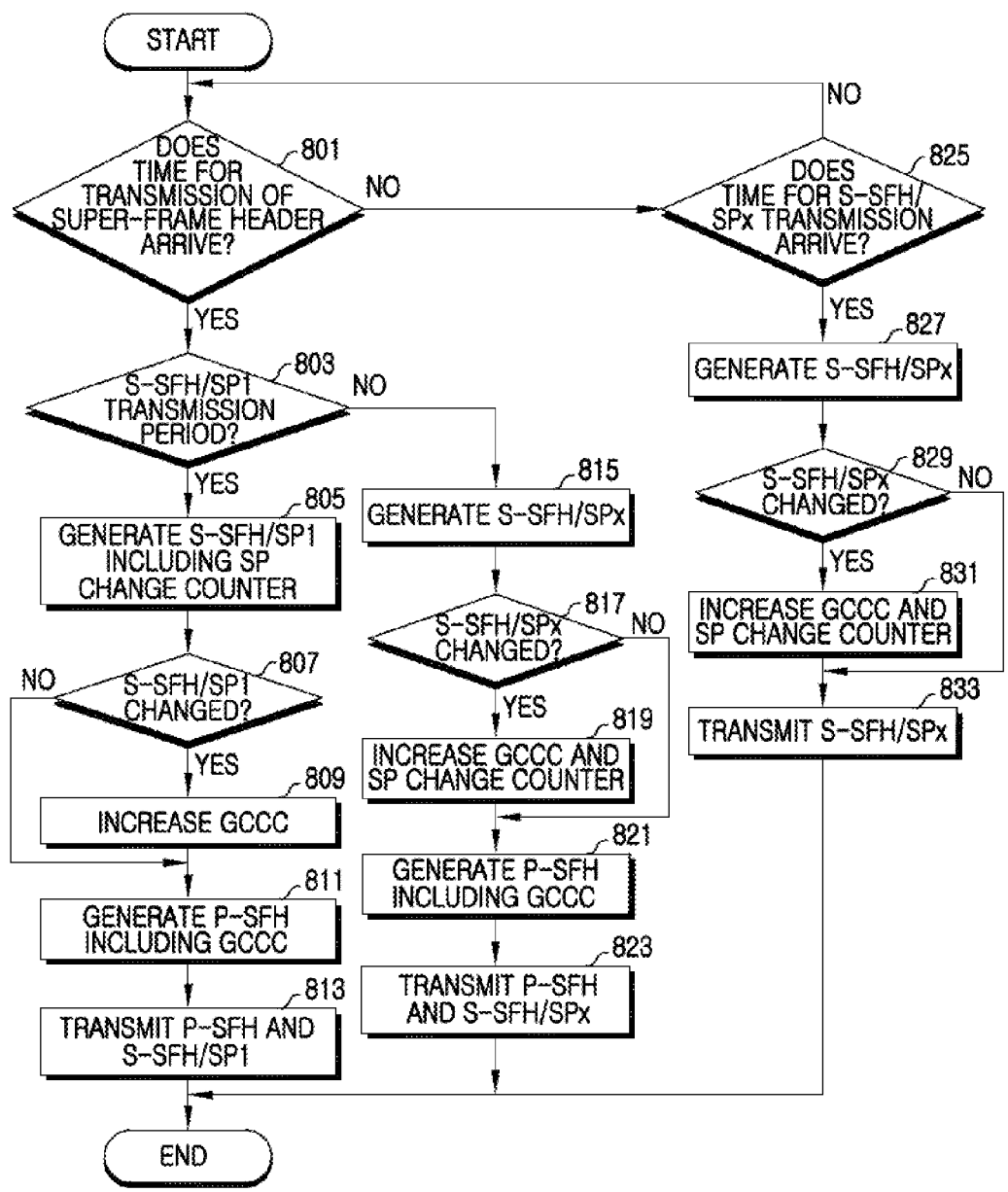
FIG. 8 is a flowchart illustrating an operation procedure of a Base Station (BS) in a broadband wireless communication system according to a first exemplary embodiment of the present invention.

FIG. 8 illustrates an operation procedure of a BS in a broadband wireless communication system according to a first exemplary embodiment of the present invention. FIG. 8 illustrates an operation procedure of a BS according to a first exemplary embodiment in which an SP change counter is transmitted through an S-SFH/SP1.

Referring to FIG. 8, in step 801, the BS determines if a time for transmission of a super-frame header arrives. In other words, the BS determines if a time to transmit a common control channel including one of a P-SFH, an S-SFH/SP1, and an S-SFH/SPx and a synchronization channel arrives. Here, the S-SFH/SPx represents a remainder not including an S-SFH/SP1 from among SPs of an S-SFH.

If the time for transmission of the super-frame header arrives, the BS proceeds to step 803 and determines if it is a transmission period of the S-SFH/SP1. That is, the transmission period of the S-SFH/SP1 is variable, and may be set to a value of one or more super frames depending on a characteristic of a system.

If it is the transmission period of the S-SFH/SP1, in other words, if it is the time for transmission of the S-SFH/SP1 through the super-frame header, the BS proceeds to step 805 and generates an S-SFH/SP1 including an SP change counter. That is, the BS configures system control information to be transmitted through the S-SFH/SP1 and information including the SP change counter, and encodes and modulates the information in an encoding scheme and modulation scheme for S-SFH/SP1.

After generating the S-SFH/SP1, the BS proceeds to step 807 and determines if the S-SFH/SP1 is changed. That is, the BS compares information included in a previously transmitted S-SFH/SP1 with information included in the S-SFH/SP1 generated in step 803, and determines if changed information exists. However, among the information included in the S-SFH/SP1, an SP change counter is excluded. If the S-SFH/SP1 is not changed, the BS proceeds to step 811.

On the other hand, if the S-SFH/SP1 is changed, the BS proceeds to step 809 and increases a GCCC. That is, the BS increases the GCCC to inform an MS of a change of the S-SFH/SP1.

Then, the BS proceeds to step 811 and generates a P-SFH including the GCCC. That is, the BS configures system control information to be transmitted through the P-SFH and information including the GCCC, and encodes and modulates the information in an encoding scheme and modulation scheme for P-SFH.

After generating the P-SFH, the BS proceeds to step 813 and transmits the S-SFH/SP1 and the P-SFH. In more detail, the BS maps signals of the S-SFH/SP1 and the P-SFH to a resource depending on a frame structure, and configures an OFDM symbol through an Inverse Fast Fourier Transform (IFFT) operation and Cyclic Prefix (CP) insertion. The BS then up-converts the OFDM symbol into a signal of a Radio Frequency (RF) band and then transmits the signal through an antenna. Multiplexing of the P-SFH and the S-SFH/SP1 has a form of time division or frequency division.

Returning to step 803, if it is not the transmission period of the S-SFH/SP1, in other words, if it is not the time for transmission of the S-SFH/SP1 through the super-frame header, the BS proceeds to step 815 and generates an S-SFH/SPx. That is, the BS configures system control information corresponding to at least one S-SFH/SPx transmitted through a super-frame header, and encodes and modulates the information in an encoding scheme and modulation scheme for S-SFH/SPx.

Then, the BS proceeds to step 817 and determines if the S-SFH/SPx is changed through a comparison with an S-SFH/SPx from a previous time for transmission. In other words, the BS determines if different information exists between information included in the S-SFH/SPx from the previous time for transmission and information included in the S-SFH/SPx generated in step 815. If the S-SFH/SPx is not changed, the BS proceeds to step 821.

On the other hand, if the S-SFH/SPx is changed, the BS proceeds to step 819 and increases a GCCC and an SP change counter. At this time, if a plurality of S-SFH/SPxs are changed, the BS increases the GCCC and the SP change counter by as much as a changed S-SFH/SPx number.

Then, the BS proceeds to step 821 and generates a P-SFH including the GCCC. That is, the BS configures system control information to be transmitted through the P-SFH and information including the GCCC, and encodes and modulates the information in an encoding scheme and modulation scheme for P-SFH.

After generating the P-SFH, the BS proceeds to step 823 and transmits the S-SFH/SPx and the P-SFH. In more detail, the BS maps signals of the S-SFH/SPx and the P-SFH to a resource depending on a frame structure, and configures an OFDM symbol through IFFT operation and CP insertion. The BS up-converts the OFDM symbol into an RF band signal and then transmits the signal through the antenna. Multiplexing of the P-SFH and the S-SFH/SPx has a form of time division or frequency division.

Returning to step 801, if the time for transmission of the super-frame header does not arrive, the BS proceeds to step 825 and determines if a time for transmission of an S-SFH/SPx arrives. At this time, the S-SFH/SPx transmitted by the BS may be plural. In this case, the BS may determine if the time for transmission of at least one S-SFH/SPx arrives.

If the time for transmission of the S-SFH/SPx arrives, the BS proceeds to step 827 and generates an S-SFH/SPx. That is, the BS configures system control information corresponding to at least one S-SFH/SPx whose time for transmission arrives, and encodes and modulates the information in an encoding scheme and modulation scheme for S-SFH/SPx.

Then, the BS proceeds to step 829 and determines if the S-SFH/SPx is changed through a comparison with an S-SFH/SPx from a previous time for transmission. In other words, the BS determines if different information exists between information included in the S-SFH/SPx from the previous time for transmission and information included in the S-SFH/SPx generated in step 827. If the S-SFH/SPx is not changed, the BS proceeds to step 833.

On the other hand, if the S-SFH/SPx is changed, the BS proceeds to step 831 and increases a GCCC and an SP change counter. At this time, if a plurality of S-SFH/SPxs are changed, the BS increases the GCCC and the SP change counter by as much as a changed S-SFH/SPx number.

Next, the BS proceeds to step 833 and transmits the S-SFH/SPx. In more detail, the BS maps a signal of the S-SFH/SPx to a resource depending on a frame structure, and configures an OFDM symbol through IFFT operation and CP insertion. The BS up-converts the OFDM symbol into an RF band signal and then transmits the signal through the antenna.

Figure 9:
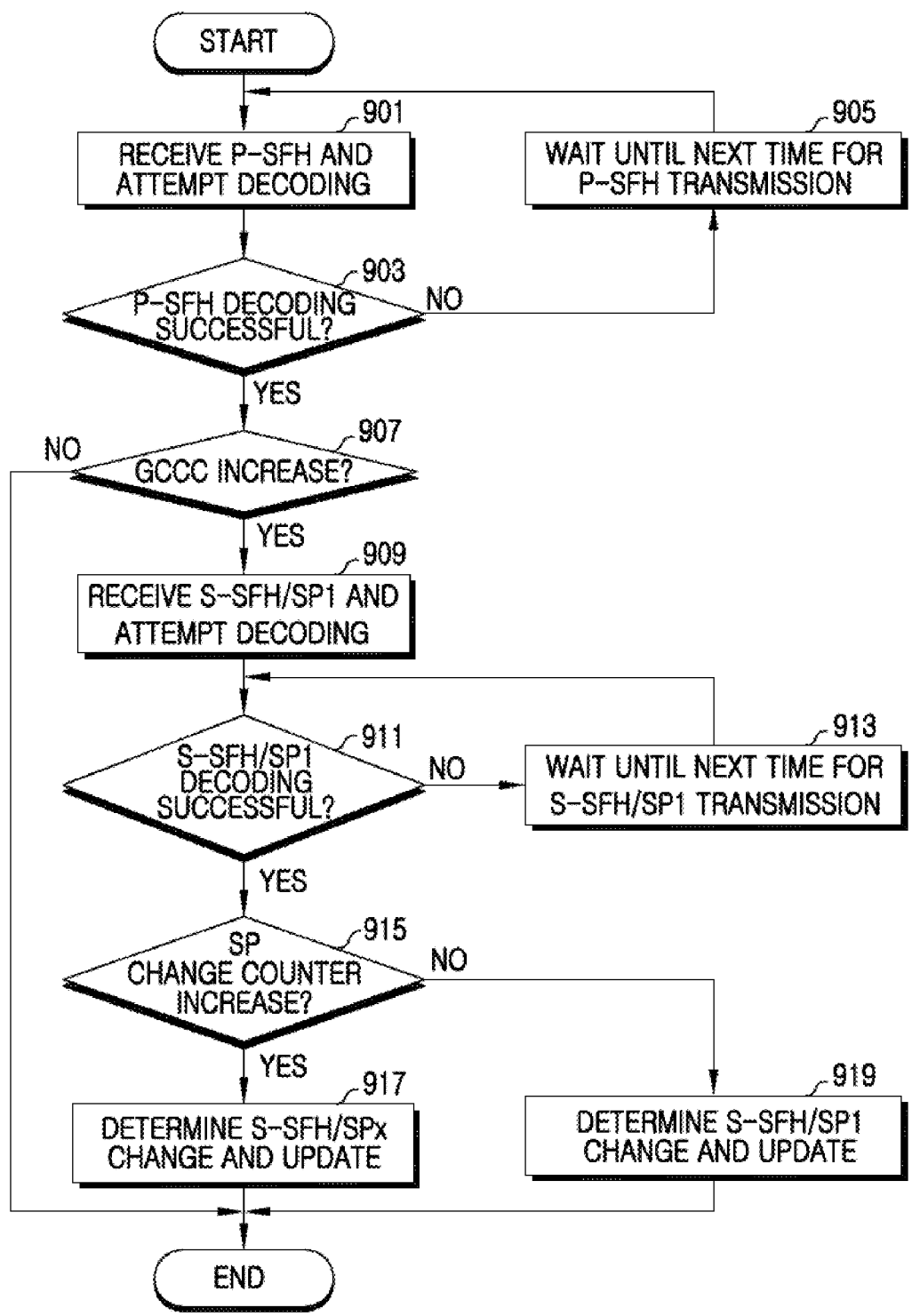
FIG. 9 is a flowchart illustrating an operation procedure of a Mobile Station (MS) in a broadband wireless communication system according to a first exemplary embodiment of the present invention.

FIG. 9 illustrates an operation procedure of an MS in a broadband wireless communication system according to a first exemplary embodiment of the present invention. FIG. 9 illustrates an operation procedure of an MS according to a first exemplary embodiment where an SP change counter is transmitted through an S-SFH/SP1.

Referring to FIG. 9, in step 901, the MS receives a P-SFH within a super-frame header included in a start portion of a super frame, and attempts to decode the P-SFH. That is, the MS extracts a signal of the P-SFH depending on a frame structure and, by demodulating, converts the signal into a bit stream and then, performs a Cyclic Redundancy Check (CRC).

Then, the MS proceeds to step 903 and determines if the decoding of the P-SFH is successful. In other words, the MS determines if an error does not occur as the CRC result.

If the decoding of the P-SFH fails, the MS proceeds to step 905 and waits until a next time for P-SFH transmission. The MS then returns to step 901. In other words, the MS waits until the time for transmission of a next super-frame header and then, returns to step 901.

On the other hand, if the decoding of the P-SFH is successful, the MS proceeds to step 907 and determines if a GCCC received through the P-SFH increases. The MS compares a stored GCCC with a newly received GCCC.

If the GCCC increases, in step 909, the MS receives an S-SFH/SP1, and attempts to decode the S-SFH/SP1. That is, the MS extracts a signal of the S-SFH/SP1 depending on a frame structure and, by decoding, converts the signal into a bit stream.

After attempting the decoding of the S-SFH/SP1, the MS proceeds to step 911 and determines a success or failure of decoding for the S-SFH/SP1. In other words, the MS performs a CRC for the bit stream. If the decoding of the S-SFH/SP1 fails, the MS proceeds to step 913 and waits until a next time for S-SFH/SP1 transmission. The MS then returns to step 909. In other words, the MS waits until a next S-SFH/SP1 transmission period and then, returns to step 911.

On the other hand, if the decoding of the S-SFH/SP1 is successful in step 911, the MS proceeds to step 915 and determines if an SP change counter included in the S-SFH/SP1 increases. That is, the MS compares the SP change counter included within the S-SFH/SP1 with a stored SP change counter, and determines if they are different from each other.

If the SP change counter increases, it indicates that an S-SFH/SPx is changed. Thus, in step 917, the MS determines that the S-SFH/SPx is changed, and receives and updates the S-SFH/SPx. In other words, if the time for transmission of the S-SFH/SPx arrives, the MS receives the S-SFH/SPx and updates a stored S-SFH/SPx using the newly received S-SFH/SPx. Here, the S-SFH/SPx represents a remainder not including an S-SFH/SP1 from among SPs of an S-SFH.

On the other hand, if the SP change counter does not increase, it indicates that an S-SFH/SP1 is changed. Thus, in step 919, the MS updates a stored S-SFH/SP1 by the S-SFH/SP1 decoded in step 911.

In the operation procedure of the MS described with reference to FIG. 9, it is assumed that only one S-SFH/SPx exists. However, a plurality of S-SFH/SPxs may exist. In this case, steps 915 and 917 are each performed for each S-SFH/SPx. That is, in step 915, the MS reads an SP change counter corresponding to each S-SFH/SPx and, if at least one SP change counter increases, proceeds to step 917 and updates an S-SFH/SPx corresponding to the increased SP change counter.

Figure 10:
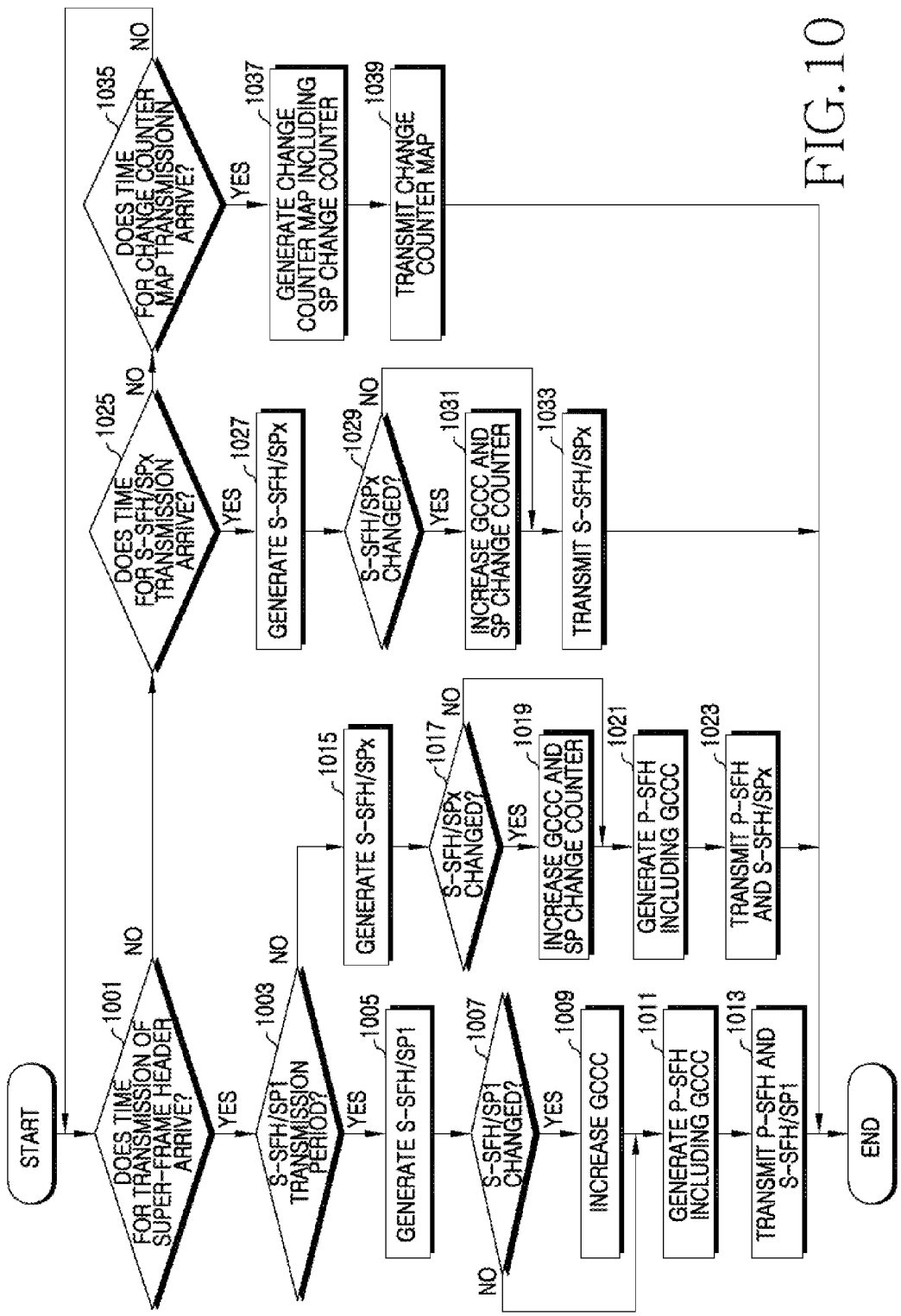
FIG. 10 is a flowchart illustrating an operation procedure of a BS in a broadband wireless communication system according to a second exemplary embodiment of the present invention.

FIG. 10 illustrates an operation procedure of a BS in a broadband wireless communication system according to a second exemplary embodiment of the present invention. FIG. 10 illustrates an operation procedure of a BS according to a second exemplary embodiment where an SP change counter is transmitted through a map region.

Referring to FIG. 10, in step 1001, the BS determines if a time for transmission of a super-frame header arrives. In other words, the BS determines if the time to transmit a common control channel including one of a P-SFH, an S-SFH/SP1, and an S-SFH/SPx and a synchronization channel arrives. Here, the S-SFH/SPx represents a remainder not including an S-SFH/SP1 from among SPs of an S-SFH.

If the time for transmission of the super-frame header arrives, the BS proceeds to step 1003 and determines if it is a transmission period of the S-SFH/SP1. That is, the transmission period of the S-SFH/SP1 is variable, and may be set to a value of one or more super frames depending on a characteristic of a system.

If it is the transmission period of the S-SFH/SP1, in other words, if it is the time for transmission of the S-SFH/SP1 through the super-frame header, the BS proceeds to step 1005 and generates an S-SFH/SP1. That is, the BS configures information including system control information to be transmitted through the S-SFH/SP1, and encodes and modulates the information in an encoding scheme and modulation scheme for S-SFH/SP1.

After generating the S-SFH/SP1, the BS proceeds to step 1007 and determines if the S-SFH/SP1 is changed. That is, the BS compares information included in a previously transmitted S-SFH/SP1 with information included in the S-SFH/SP1 generated in step 1005, and determines if changed information exists. If the S-SFH/SP1 is not changed, the BS proceeds to step 1011.

On the other hand, if the S-SFH/SP1 is changed, the BS proceeds to step 1009 and increases a GCCC. That is, the BS increases the GCCC to inform an MS of a change of the S-SFH/SP1.

Then, the BS proceeds to step 1011 and generates a P-SFH including the GCCC. That is, the BS configures system control information to be transmitted through the P-SFH and information including the GCCC, and encodes and modulates the information in an encoding scheme and modulation scheme for P-SFH.

After generating the P-SFH, the BS proceeds to step 1013 and transmits the S-SFH/SP1 and the P-SFH. In more detail, the BS maps signals of the S-SFH/SP1 and the P-SFH to a resource depending on a frame structure, and configures an OFDM symbol through IFFT operation and CP insertion. The BS then up-converts the OFDM symbol into an RF band signal and then transmits the signal through an antenna. Multiplexing of the P-SFH and the S-SFH/SP1 has a form of time division or frequency division.

Returning to step 1003, if it is not the transmission period of the S-SFH/SP1, in other words, if it is not the time for transmission of the S-SFH/SP1 through the super-frame header, the BS proceeds to step 1015 and generates an S-SFH/SPx. That is, the BS configures system control information corresponding to at least one S-SFH/SPx transmitted through a super-frame header, and encodes and modulates the information in an encoding scheme and modulation scheme for S-SFH/SPx.

Then, the BS proceeds to step 1017 and determines if the S-SFH/SPx is changed through a comparison with an S-SFH/SPx from a previous time for transmission. In other words, the BS determines if different information exists between information included in the S-SFH/SPx from the previous time for transmission and information included in the S-SFH/SPx generated in step 1015. If the S-SFH/SPx is not changed, the BS proceeds to step 1021.

On the other hand, if the S-SFH/SPx is changed, the BS proceeds to step 1019 and increases a GCCC and an SP change counter. At this time, if a plurality of S-SFH/SPxs are changed, the BS increases the GCCC and the SP change counter by as much as a changed S-SFH/SPx number.

Then, the BS proceeds to step 1021 and generates a P-SFH including the GCCC. That is, the BS configures system control information to be transmitted through the P-SFH and information including the GCCC, and encodes and modulates the information in an encoding scheme and modulation scheme for P-SFH.

After generating the P-SFH, the BS proceeds to step 1023 and transmits the S-SFH/SPx and the P-SFH. In more detail, the BS maps signals of the S-SFH/SPx and the P-SFH to a resource depending on a frame structure, and configures an OFDM symbol through IFFT operation and CP insertion. The BS then up-converts the OFDM symbol into an RF band signal and then transmits the signal through the antenna. Multiplexing of the P-SFH and the S-SFH/SPx has a form of time division or frequency division.

Returning to step 1001, if the time for transmission of the super-frame header does not arrive, the BS proceeds to step 1025 and determines if a time for transmission of an S-SFH/SPx arrives. At this time, the S-SFH/SPx transmitted by the BS may be plural. In this case, the BS may determine if the time for transmission of at least one S-SFH/SPx arrives.

If the time for transmission of the S-SFH/SPx arrives, the BS proceeds to step 1027 and generates an S-SFH/SPx. That is, the BS configures system control information corresponding to at least one S-SFH/SPx whose time for transmission arrives, and encodes and modulates the information in an encoding scheme and modulation scheme for S-SFH/SPx.

Then, the BS proceeds to step 1029 and determines if the S-SFH/SPx is changed through a comparison with an S-SFH/SPx from a previous time for transmission. In other words, the BS determines if different information exists between information included in the S-SFH/SPx from the previous time for transmission and information included in the S-SFH/SPx generated in step 1027. If the S-SFH/SPx is not changed, the BS proceeds to step 1033.

On the other hand, if the S-SFH/SPx is changed, the BS proceeds to step 1031 and increases a GCCC and an SP change counter. At this time, if a plurality of S-SFH/SPxs are changed, the BS increases the GCCC and the SP change counter by as much as a changed S-SFH/SPx number.

Next, the BS proceeds to step 1033 and transmits the S-SFH/SPx. In more detail, the BS maps a signal of the S-SFH/SPx to a resource depending on a frame structure, and configures an OFDM symbol through IFFT operation and CP insertion. The BS then up-converts the OFDM symbol into an RF band signal and then transmits the signal through the antenna.

Returning to step 1025, if the time for transmission of the S-SFH/SPx does not arrive, the BS proceeds to step 1035 and determines if a time for transmission of a change counter map arrives. That is, the change counter map is transmitted periodically according to a predefined period, and the BS determines if it is a transmission period of the change counter map.

If the time for transmission of the change counter map arrives, the BS proceeds to step 1037 and generates a change counter map including an SP change counter. In other words, the BS configures map information including the SP change counter, and encodes and modulates the information in an encoding scheme and modulation scheme for change counter map. At this time, the BS scrambles the change counter map depending on a scrambling code particular to the change counter map, or includes a parameter that identifies the change counter map.

After generating the change counter map, the BS proceeds to step 1039 and transmits the change counter map. In more detail, the BS maps a signal of the change counter map to a resource depending on a frame structure, and configures an OFDM symbol through IFFT operation and CP insertion. The BS then up-converts the OFDM symbol into an RF band signal and then transmits the signal through the antenna.

Figure 11:
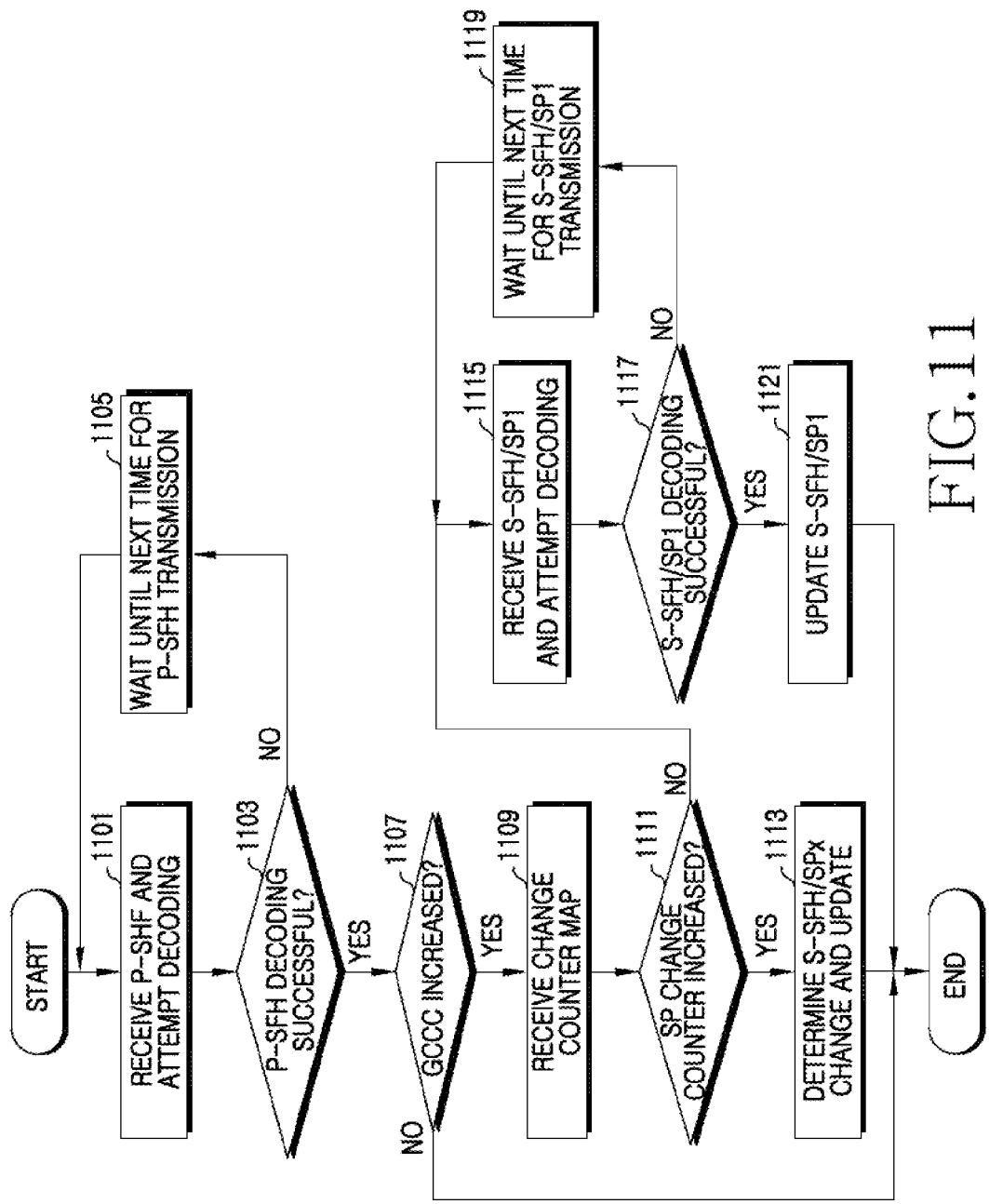
FIG. 11 is a flowchart illustrating an operation procedure of an MS in a broadband wireless communication system according to a second exemplary embodiment of the present invention.

FIG. 11 illustrates an operation procedure of an MS in a broadband wireless communication system according to a second exemplary embodiment of the present invention. FIG. 11 illustrates an operation procedure of an MS according to a second exemplary embodiment where an SP change counter is transmitted through a map region.

Referring to FIG. 11, in step 1101, the MS receives a P-SFH within a super-frame header included in a start portion of a super frame, and attempts to decode the P-SFH. That is, the MS extracts a signal of the P-SFH depending on a frame structure and, by demodulating, converts the signal into a bit stream and then, performs a CRC.

Then, the MS proceeds to step 1103 and determines if the decoding of the P-SFH is successful. In other words, the MS determines if an error does not occur as the CRC result.

If the decoding of the P-SFH fails, the MS proceeds to step 1105 and waits until a next time for P-SFH transmission. The MS then returns to step 1101. In other words, the MS waits until the time for transmission of a next super-frame header and then, returns to step 1101.

On the other hand, if the decoding of the P-SFH is successful, the MS proceeds to step 1107 and determines if a GCCC received through the P-SFH increases. That is, the MS compares a stored GCCC with a newly received GCCC.

If the GCCC increases, the MS proceeds to step 1109 and receives a change counter map. In other words, if the time for transmission of the change counter map arrives, the MS receives the change counter map. The MS then reads an SP change counter included in the change counter map. At this time, the MS descrambles the received change counter map by a scrambling code particular to the change counter map. Alternatively, the MS identifies the change counter map among a plurality of maps through a parameter that identifies the change counter map.

After receiving the change counter map, the MS proceeds to step 1111 and determines if an SP change counter included in the change counter map increases. That is, the MS compares the SP change counter included in the change counter map with a stored SP change counter, and determines if they are different from each other.

If the SP change counter increases, it indicates that an S-SFH/SPx is changed. Thus, in step 1113, the MS determines that the S-SFH/SPx is changed, and receives and updates the S-SFH/SPx. In other words, if the time for transmission of the S-SFH/SPx arrives, the MS receives the S-SFH/SPx and updates a stored S-SFH/SPx by the newly received S-SFH/SPx. Here, the S-SFH/SPx represents a remainder not including an S-SFH/SP1 from among SPs of an S-SFH.

If the SP change counter does not increase in step 1111, it indicates that an S-SFH/SP1 is changed. Thus, in step 1115, the MS receives the S-SFH/SP1, and attempts to decode the S-SFH/SP1. That is, the MS extracts a signal of the S-SFH/SP1 depending on a frame structure and, by demodulating, converts the signal into a bit stream.

After attempting the decoding of the S-SFH/SP1, the MS proceeds to step 1117 and determines a success or failure of decoding for the S-SFH/SP1. In other words, the MS performs a CRC for the bit stream. If the decoding of the S-SFH/SP1 fails, the MS proceeds to step 1119 and waits until the next time for S-SFH/SP1 transmission. The MS then returns to step 1115. In other words, the MS waits until a next S-SFH/SP1 transmission period and then, returns to step 1115.

On the other hand, if the decoding of the S-SFH/SP1 is successful, the MS proceeds to step 1121 and updates a stored S-SFH/SP1 by the S-SFH/SP1 decoded in step 1115.

In the operation procedure of the MS described with reference to FIG. 11, it is assumed that only one S-SFH/SPx exists. However, a plurality of S-SFH/SPxs may exist. In this case, steps 1111 and 1113 are each performed for each S-SFH/SPx. That is, in step 1111, the MS reads an SP change counter corresponding to each S-SFH/SPx and, if at least one SP change counter increases, proceeds to step 1113 and updates an S-SFH/SPx corresponding to the increased SP change counter.

Figure 12:
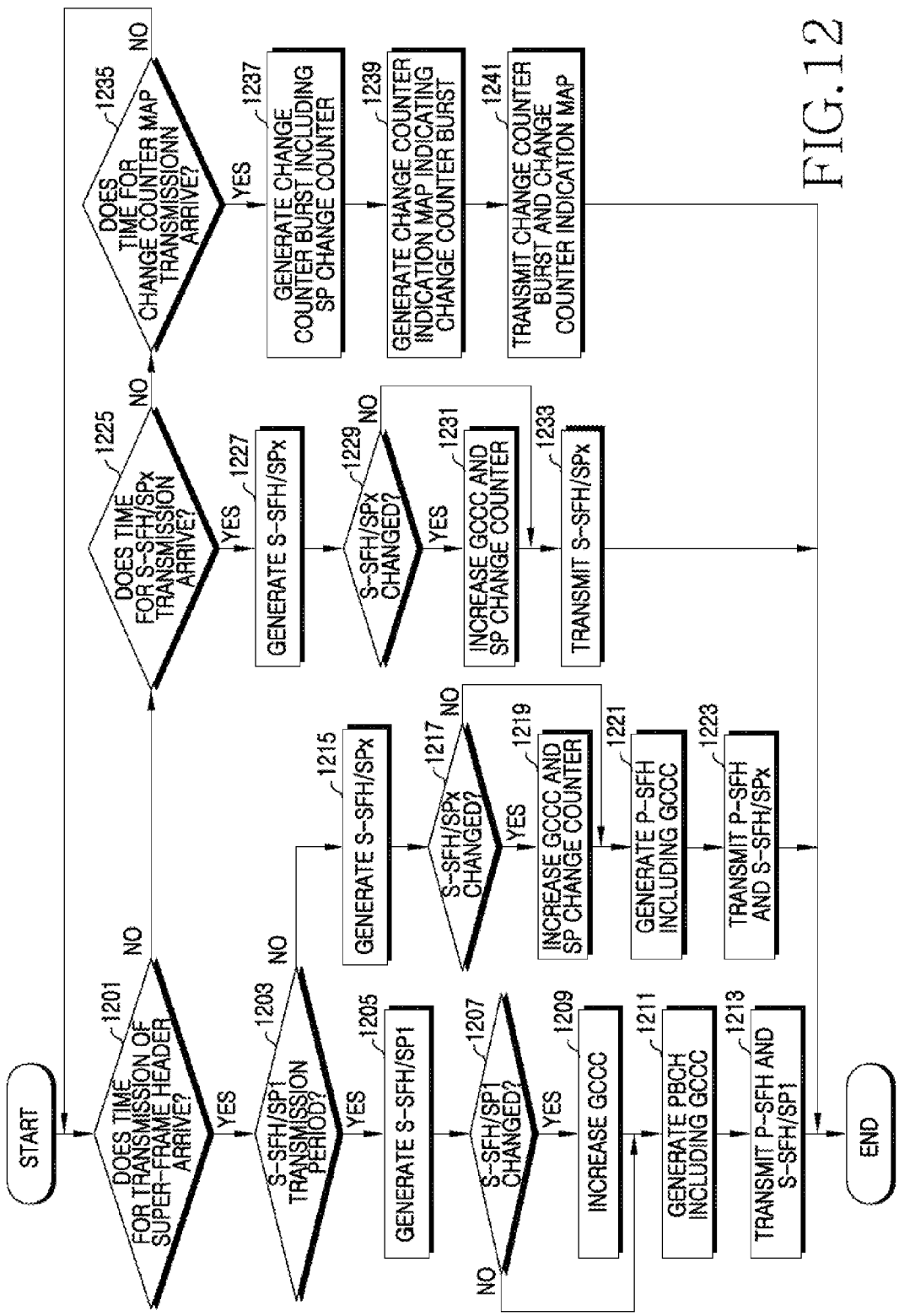
FIG. 12 is a flowchart illustrating an operation procedure of a BS in a broadband wireless communication system according to a third exemplary embodiment of the present invention.

FIG. 12 illustrates an operation procedure of a BS in a broadband wireless communication system according to a third exemplary embodiment of the present invention. FIG. 12 illustrates an operation procedure of a BS according to a third exemplary embodiment in which an SP change counter is transmitted through a data region.

Referring to FIG. 12, in step 1201, the BS determines if a time for transmission of a super-frame header arrives. In other words, the BS determines if the time to transmit a common control channel including one of a P-SFH, an S-SFH/SP1, and an S-SFH/SPx and a synchronization channel arrives. Here, the S-SFH/SPx represents a remainder not including an S-SFH/SP1 from among SPs of an S-SFH.

If the time for transmission of the super-frame header arrives, the BS proceeds to step 1203 and determines if it is a transmission period of the S-SFH/SP1. That is, the transmission period of the S-SFH/SP1 is variable, and may be set to a value of one or more super frames depending on a characteristic of a system.

If it is the transmission period of the S-SFH/SP1, in other words, if it is time for transmission of the S-SFH/SP1 through the super-frame header, the BS proceeds to step 1205 and generates an S-SFH/SP1. That is, the BS configures information including system control information to be transmitted through the S-SFH/SP1, and encodes and modulates the information in an encoding scheme and modulation scheme for S-SFH/SP1.

After generating the S-SFH/SP1, the BS proceeds to step 1207 and determines if the S-SFH/SP1 is changed. That is, the BS compares information included in a previously transmitted S-SFH/SP1 with information included in the S-SFH/SP1 generated in step 1205, and determines if changed information exists. If the S-SFH/SP1 is not changed, the BS proceeds to step 1211.

On the other hand, if the S-SFH/SP1 is changed, the BS proceeds to step 1209 and increases a GCCC. That is, the BS increases the GCCC to inform an MS of a change of the S-SFH/SP1.

Then, the BS proceeds to step 1211 and generates a P-SFH including the GCCC. That is, the BS configures system control information to be transmitted through the P-SFH and information including the GCCC, and encodes and modulates the information in an encoding scheme and modulation scheme for P-SFH.

After generating the P-SFH, the BS proceeds to step 1213 and transmits the S-SFH/SP1 and the P-SFH. In more detail, the BS maps signals of the S-SFH/SP1 and the P-SFH to a resource depending on a frame structure, and configures an OFDM symbol through IFFT operation and CP insertion. The BS then up-converts the OFDM symbol into an RF band signal and then transmits the signal through an antenna. Multiplexing of the P-SFH and the S-SFH/SP1 has a form of time division or frequency division.

Returning to step 1203, if it is not the transmission period of the S-SFH/SP1, in other words, if it is not the time for transmission of the S-SFH/SP1 through the super-frame header, the BS proceeds to step 1215 and generates an S-SFH/SPx. That is, the BS configures system control information corresponding to at least one S-SFH/SPx transmitted through a super-frame header, and encodes and modulates the information in an encoding scheme and modulation scheme for S-SFH/SPx.

Then, the BS proceeds to step 1217 and determines if the S-SFH/SPx is changed through a comparison with an S-SFH/SPx from a previous time for transmission. In other words, the BS determines if different information exists between information included in the S-SFH/SPx from the previous time for transmission and information included in the S-SFH/SPx generated in step 1215. If the S-SFH/SPx is not changed, the BS proceeds to step 1221.

On the other hand, if the S-SFH/SPx is changed, the BS proceeds to step 1219 and increases a GCCC and an SP change counter. At this time, if a plurality of S-SFH/SPxs are changed, the BS increases the GCCC and the SP change counter by as much as a changed S-SFH/SPx number.

Then, the BS proceeds to step 1221 and generates a P-SFH including the GCCC. That is, the BS configures system control information to be transmitted through the P-SFH and information including the GCCC, and encodes and modulates the information in an encoding scheme and modulation scheme for P-SFH.

After generating the P-SFH, the BS proceeds to step 1223 and transmits the S-SFH/SPx and the P-SFH. In more detail, the BS maps signals of the S-SFH/SPx and the P-SFH to a resource depending on a frame structure, and configures an OFDM symbol through IFFT operation and CP insertion. The BS then up-converts the OFDM symbol into an RF band signal and then transmits the signal through the antenna. Multiplexing of the P-SFH and the S-SFH/SPx has a form of time division or frequency division.

Returning to step 1201, if the time for transmission of the super-frame header does not arrive, the BS proceeds to step 1225 and determines if a time for transmission of an S-SFH/SPx arrives. At this time, the S-SFH/SPx transmitted by the BS may be plural. In this case, the BS may determine if the time for transmission of at least one S-SFH/SPx arrives.

If the time for transmission of the S-SFH/SPx arrives, the BS proceeds to step 1227 and generates an S-SFH/SPx. That is, the BS configures system control information corresponding to at least one S-SFH/SPx whose time for transmission arrives, and encodes and modulates the information in an encoding scheme and modulation scheme for S-SFH/SPx.

Then, the BS proceeds to step 1229 and determines if the S-SFH/SPx is changed through a comparison with an S-SFH/SPx from a previous time for transmission. In other words, the BS determines if different information exists between information included in the S-SFH/SPx from the previous time for transmission and information included in the S-SFH/SPx generated in step 1227. If the S-SFH/SPx is not changed, the BS proceeds to step 1233.

On the other hand, if the S-SFH/SPx is changed, the BS proceeds to step 1231 and increases a GCCC and an SP change counter. At this time, if a plurality of S-SFH/SPxs are changed, the BS increases the GCCC and the SP change counter by as much as a changed S-SFH/SPx number.

Next, the BS proceeds to step 1233 and transmits the S-SFH/SPx. In more detail, the BS maps a signal of the S-SFH/SPx to a resource depending on a frame structure, and configures an OFDM symbol through IFFT operation and CP insertion. The BS then up-converts the OFDM symbol into an RF band signal and then transmits the signal through the antenna.

Returning to step 1225, if the time for transmission of the S-SFH/SPx does not arrive, the BS proceeds to step 1235 and determines if a time for transmission of a change counter burst arrives. That is, the change counter burst is transmitted periodically according to a predefined period, and the BS determines if it is a transmission period of the change counter burst.

If the time for transmission of the change counter burst arrives, the BS proceeds to step 1237 and generates a change counter burst including an SP change counter. In other words, the BS configures map information including the SP change counter, and encodes and modulates the information in an encoding scheme and modulation scheme for change counter burst.

After generating the change counter burst, the BS proceeds to step 1239 and transmits a change counter indication map indicating the change counter burst. That is, the BS generates a map including resource allocation information of the change counter burst. At this time, the BS includes, in the map, information representing that a burst indicated by the map is the change counter burst.

After generating the change counter indication map, the BS proceeds to step 1241 and transmits the change counter burst and the change counter indication map. In more detail, the BS maps a signal of the change counter burst and a signal of the change counter indication map to a resource depending on a frame structure, and configures an OFDM symbol through IFFT operation and CP insertion. The BS then up-converts the OFDM symbol into an RF band signal and then transmits the signal through the antenna.

Figure 13:
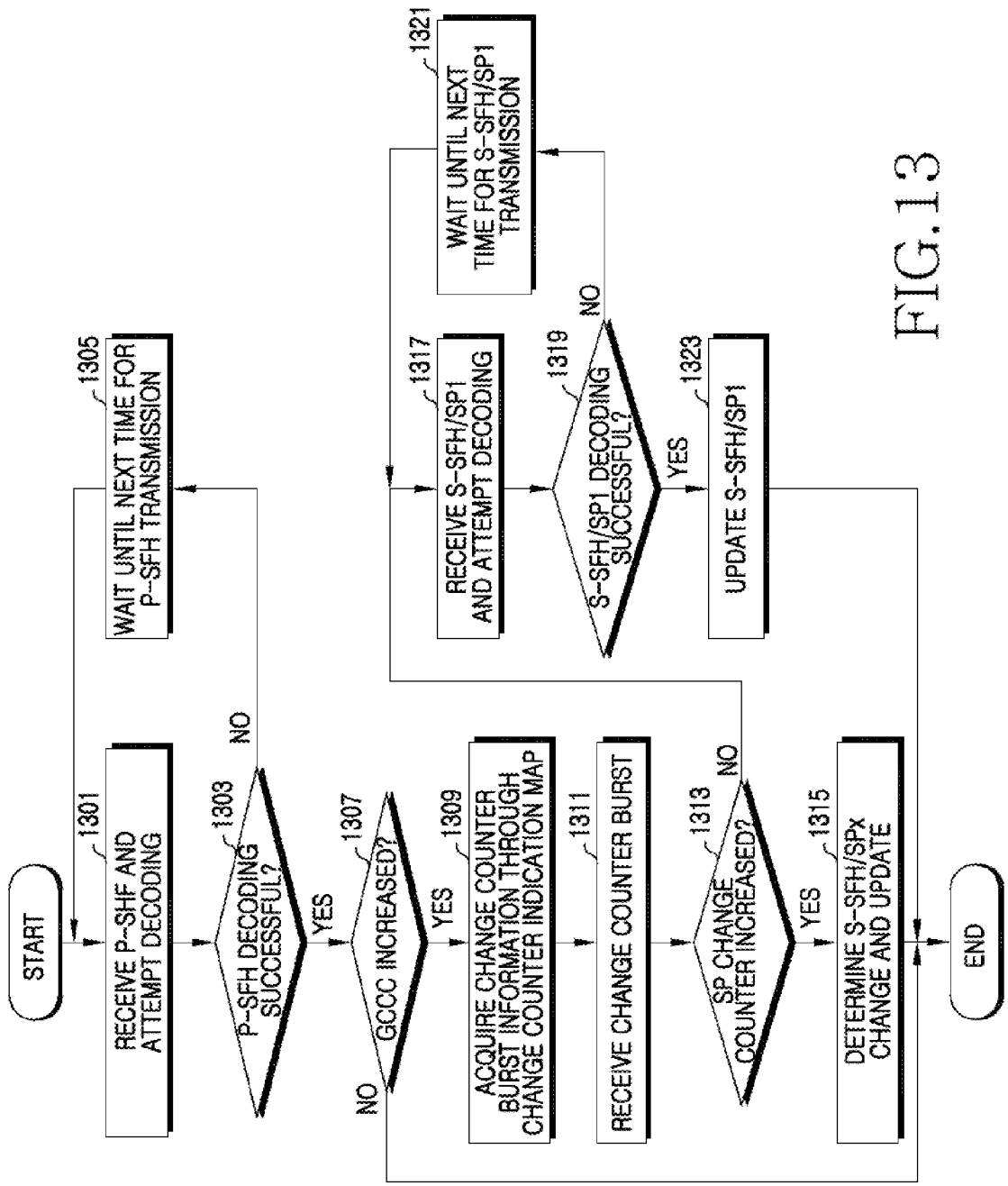
FIG. 13 is a flowchart illustrating an operation procedure of an MS in a broadband wireless communication system according to a third exemplary embodiment of the present invention.

FIG. 13 illustrates an operation procedure of an MS in a broadband wireless communication system according to a third exemplary embodiment of the present invention. FIG. 13 illustrates an operation procedure of an MS according to a third exemplary embodiment in which an SP change counter is transmitted through a map region.

Referring to FIG. 13, in step 1301, the MS receives a P-SFH within a super-frame header included in a start portion of a super frame, and attempts to decode the P-SFH. That is, the MS extracts a signal of the P-SFH depending on a frame structure and, by demodulating, converts the signal into a bit stream and then, performs a CRC.

Then, the MS proceeds to step 1303 and determines if the decoding of the P-SFH is successful. In other words, the MS determines if an error does not occur as the CRC result.

If the decoding of the P-SFH fails, the MS proceeds to step 1305 and waits until a next time for P-SFH transmission. The MS then returns to step 1301. In other words, the MS waits until the time for transmission of a next super-frame header and then, returns to step 1301.

On the other hand, if the decoding of the P-SFH is successful, the MS proceeds to step 1307 and determines if a GCCC received through the P-SFH increases. That is, the MS compares a stored GCCC with a newly received GCCC.

If the GCCC increases, the MS proceeds to step 1309 and receives a change counter indication map. In other words, if the time for transmission of the change counter indication map arrives, the MS receives the change counter indication map. The MS then acquires resource allocation information of a change counter burst included in the change counter indication map. At this time, the MS identifies the change counter indication map among a plurality of maps through information representing that a burst indicated by the map is the change counter burst.

After acquiring the resource allocation information of the change counter burst, the MS proceeds to step 1311 and receives the change counter burst. That is, the MS receives a burst indicated by the resource allocation information of the change counter burst, and reads an SP change counter included in the burst.

After receiving the change counter burst, the MS proceeds to step 1313 and determines if an SP change counter included in the change counter map increases. That is, the MS compares the SP change counter included in the change counter map with a stored SP change counter, and determines if they are different from each other.

If the SP change counter increases, it indicates that an S-SFH/SPx is changed. Thus, in step 1315, the MS determines that the S-SFH/SPx is changed, and receives and updates the S-SFH/SPx. In other words, if the time for transmission of the S-SFH/SPx arrives, the MS receives the S-SFH/SPx and updates a stored S-SFH/SPx by the newly received S-SFH/SPx. Here, the S-SFH/SPx represents a remainder not including an S-SFH/SP1 from among SPs of an S-SFH.

If the SP change counter does not increase in step 1313, it indicates that an S-SFH/SP1 is changed. Thus, in step 1317, the MS receives the S-SFH/SP1, and attempts to decode the S-SFH/SP1. That is, the MS extracts a signal of the S-SFH/SP1 depending on a frame structure and, by demodulating, converts the signal into a bit stream.

After attempting the decoding of the S-SFH/SP1, the MS proceeds to step 1319 and determines a success or failure of decoding for the S-SFH/SP1. In other words, the MS performs a CRC for the bit stream. If the decoding of the S-SFH/SP1 fails, the MS proceeds to step 1321 and waits until a next time for S-SFH/SP1 transmission. The MS then returns to step 1317. In other words, the MS waits until a next S-SFH/SP1 transmission period and then, returns to step 1317.

On the other hand, if the decoding of the S-SFH/SP1 is successful, the MS proceeds to step 1323 and updates a stored S-SFH/SP1 by the S-SFH/SP1 decoded in step 1319.

In the operation procedure of the MS described with reference to FIG. 13, it is assumed that only one S-SFH/SPx exists. However, a plurality of S-SFH/SPxs may exist. In this case, steps 1313 and 1315 are each performed for each S-SFH/SPx. That is, in step 1311, the MS reads an SP change counter corresponding to each S-SFH/SPx and, if at least one SP change counter increases, proceeds to step 1315 and updates an S-SFH/SPx corresponding to the increased SP change counter.

In the exemplary embodiments of the present invention described with reference to FIGS. 8 to 13, it is assumed that the SP change counter has a form of a counter. However, if a plurality of S-SFH/SPxs exist, the SP change counter may have a form of a bitmap. Hereafter, an 'SP change counter having bitmap form' may be referred to as an 'SP change bitmap'.

When the SP change bitmap is used, if at least one of the S-SFH/SPx is changed, at least one bit corresponding to the changed S-SFH/SPx among the SP change bitmap is changed. In more detail, an operation of a BS increasing an SP change counter in the aforementioned exemplary embodiments of the present invention is substituted as in FIG. 14 or 15. That is, an operation of increasing an SP change counter included in steps 809 and 831 of FIG. 8, steps 1019 and 1031 of FIG. 10, and steps 1219 and 1231 of FIG. 12 is substituted as follows.

Figure 14:
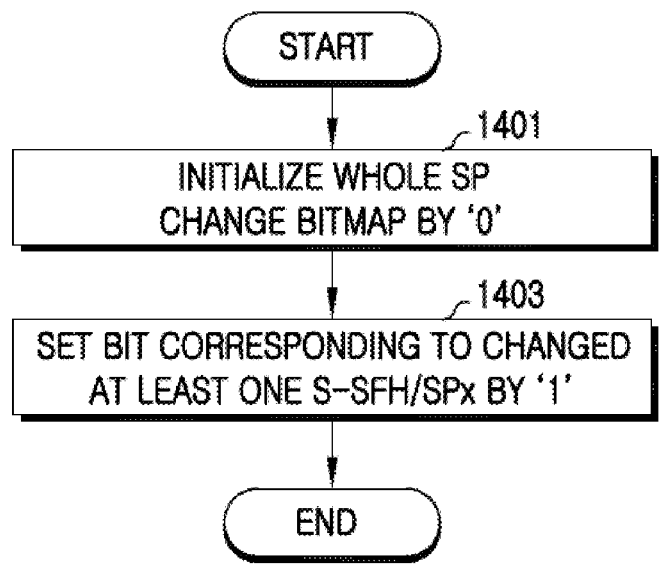
FIGS. 14 and 15 are flowcharts illustrating operation procedures of a BS using a change bitmap in a broadband wireless communication system according to an exemplary embodiment of the present invention.

FIG. 14 illustrates an operation procedure of a BS using an SP change bitmap in a broadband wireless communication system according to an exemplary embodiment of the present invention. FIG. 14 illustrates an operation procedure of a BS if an SP change bitmap allocated one bit per S-SFH/SPx is used.

Referring to FIG. 14, in step 1401, the BS initializes the whole SP change bitmap to '0'. Next, the BS proceeds to step 1403 and sets a bit corresponding to a changed at least one S-SFH/SPx to '1'. That is, when each bit of the SP change bitmap corresponds to each S-SFH/SPx, if a specific S-SFH/SPx is changed, the BS sets a corresponding bit to '1' and, if no change, sets the corresponding bit to '0'.

Figure 15:
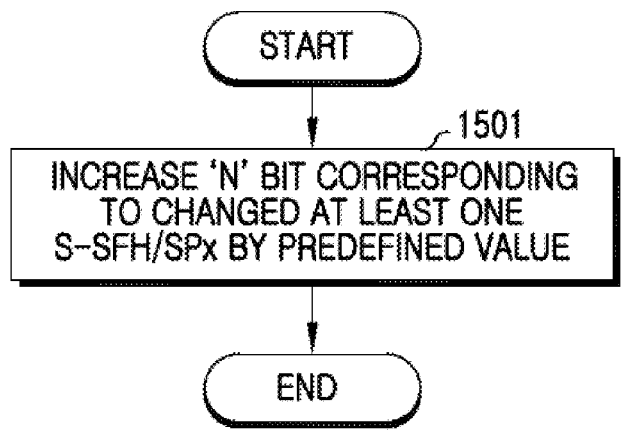

FIG. 15 illustrates an operation procedure of a BS using an SP change bitmap in a broadband wireless communication system according to an exemplary embodiment of the present invention. FIG. 15 illustrates an operation procedure of a BS if an SP change bitmap allocated one bit per S-SFH/SPx is used.

Referring to FIG. 15, in step 1501, the BS increases bits of an 'N (>1)' number corresponding to a changed at least one S-SFH/SPx by a predefined value. That is, within the bitmap, a bit stream comprised of bits of an 'N' number corresponds to one S-SFH/SPx. The BS increases each value of at least one bit stream corresponding to the at least one S-SFH/SPx among bit streams included in the bitmap, by a predefined value.

Figure 16:
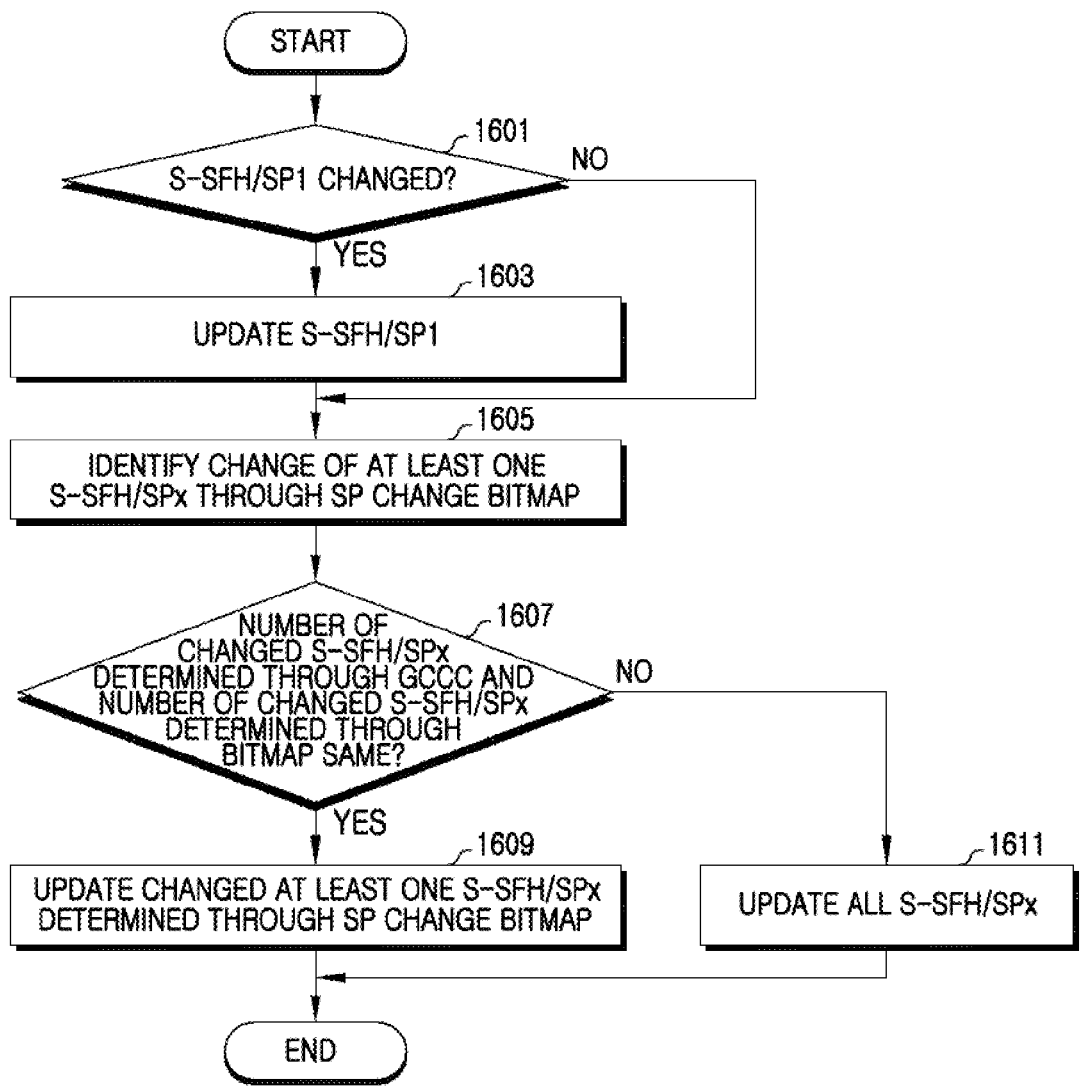
FIGS. 16 and 17 are flowcharts illustrating operation procedures of an MS determining a change of a common control message through a change bitmap in a broadband wireless communication system according to an exemplary embodiment of the present invention.

If the SP change bitmap is used, an operation of an MS updating an S-SFH/SPx through an SP change counter among the aforementioned exemplary embodiments is substituted as in FIG. 16.

FIG. 16 illustrates an operation procedure of an MS determining a change of an S-SFH/SPx through an SP change bitmap in a broadband wireless communication system according to an exemplary embodiment of the present invention. FIG. 16 illustrates an operation procedure of an MS when according to a first exemplary embodiment of the present invention. That is, if the SP change bitmap is used, step 915 to step 919 of FIG. 9 are substituted as follows.

Referring to FIG. 16, in step 1601, the MS determines if an S-SFH/SP1 is changed. If the S-SFH/SP1 is not changed, the MS proceeds to step 1605 and, if the is changed, proceeds to step 1603 and updates stored information using the changed S-SFH/SP1. Then, the MS proceeds to step 1605 and identifies a change of at least one S-SFH/SPx through an SP change bitmap included in the S-SFH/SP1. That is, the MS identifies at least one S-SFH/SPx corresponding to a position of a changed bit among the SP change bitmap.

Then, the MS proceeds to step 1607 and determines if a number of changed S-SFH/SPx determined from the SP change bitmap is the same as a number of changed S-SFH/SPx determined by an increased value of the GCCC. For example, when assuming that the GCCC increases by '1' according to a change of one of an S-SFH/SPx and an S-SFH/SP1, if the S-SFH/SP1 is not changed, the MS determines if the number of the changed S-SFH/SPx determined from the SP change bitmap is the same as the increased value of the GCCC and, if the S-SFH/SP1 is changed, the MS determines if the number of the changed S-SFH/SPx determined from the SP change bitmap is '1' less than the increased value of the GCCC.

If the number of the changed S-SFH/SPx determined from the SP change bitmap is the same as the number of the changed S-SFH/SPx determined by the increased value of the GCCC, the MS proceeds to step 1609 and updates at least one S-SFH/SPx determined through the SP change bitmap. In other words, the MS receives the changed at least one S-SFH/SPx, and updates stored information using the received at least one S-SFH/SPx.

On the other hand, if the number of the changed S-SFH/SPx determined from the SP change bitmap is not the same as the number of the changed S-SFH/SPx determined by the increased value of the GCCC, this means that it cannot be determined if any S-SFH/SPx is changed. Thus, in step 1611, the MS receives all S-SFH/SPx and, after that, updates stored information using the newly received S-SFH/SPx. For example, it may occur that it cannot be determined if any S-SFH/SPx is changed, because of entry of an idle mode or a sleep mode by the MS.

Figure 17:
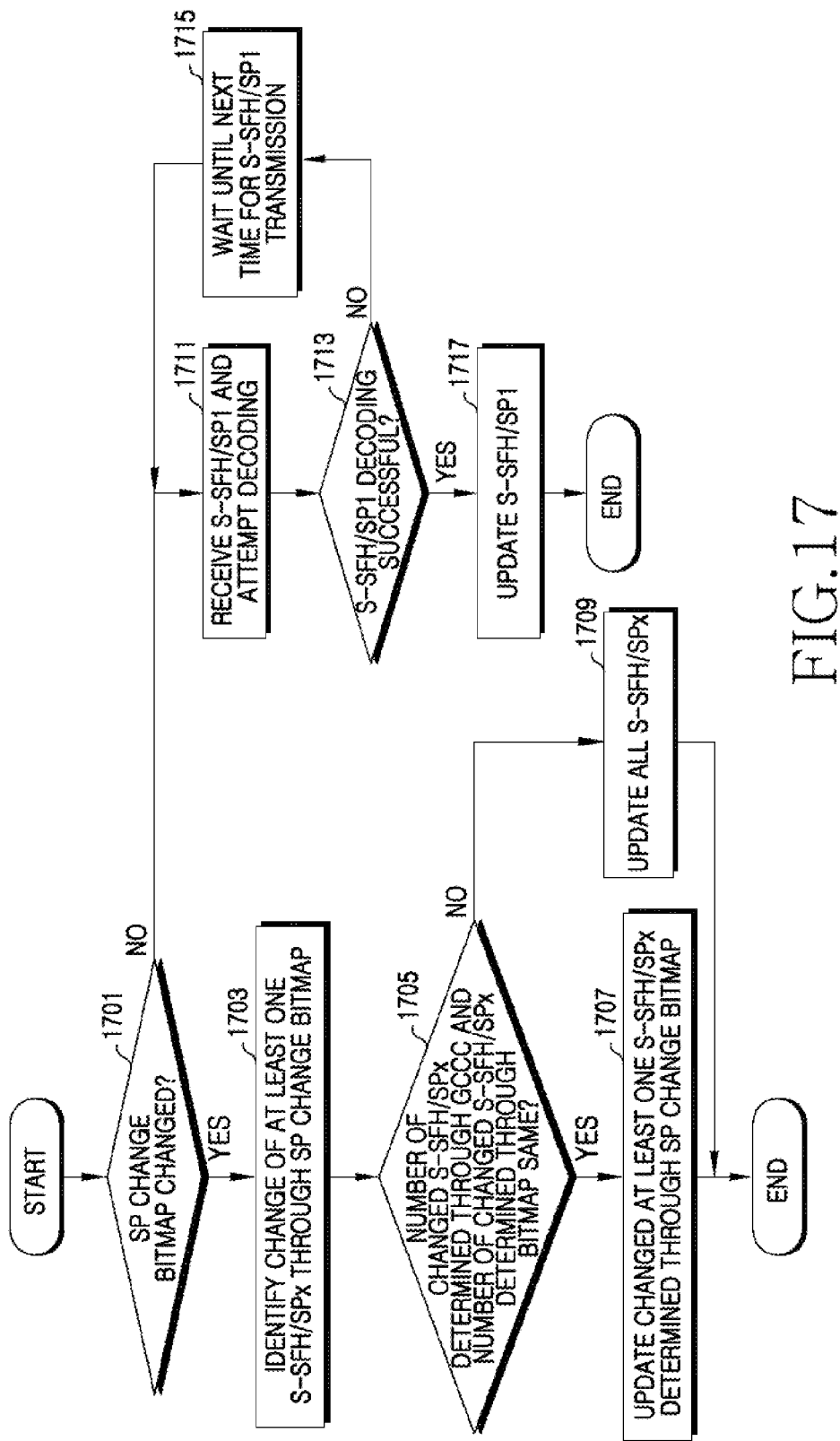

FIG. 17 illustrates an operation procedure of an MS determining a change of an S-SFH/SPx through an SP change bitmap in a broadband wireless communication system according to an exemplary embodiment of the present invention. FIG. 17 illustrates an operation procedure of an MS when according to a second exemplary embodiment and a third exemplary embodiment of the present invention. That is, if the SP change bitmap is used, step 1111 to step 1121 of FIG. 11 and step 1313 to step 1323 of FIG. 13 are substituted as follows.

Referring to FIG. 17, in step 1701, the MS determines if an SP change bitmap is changed. If the SP change bitmap is changed, the MS proceeds to step 1703 and identifies a change of at least one S-SFH/SPx through the SP change bitmap. That is, the MS identifies at least one S-SFH/SPx corresponding to a position of a changed bit among the SP change bitmap.

Then, the MS proceeds to step 1705 and determines if a number of changed S-SFH/SPx determined from the SP change bitmap is the same as a number of changed S-SFH/SPx determined by an increased value of the GCCC. For example, when assuming that a GCCC increases by '1' according to a change of one of an S-SFH/SPx and an S-SFH/SP1, if the S-SFH/SP1 is not changed, the MS determines if the number of the changed S-SFH/SPx determined from the SP change bitmap is the same as the increased value of the GCCC. If the S-SFH/SP1 is changed, the MS determines if the number of the changed S-SFH/SPx determined from the SP change bitmap is '1' less than the increased value of the GCCC.

If the number of the changed S-SFH/SPx determined from the SP change bitmap is the same as the number of the changed S-SFH/SPx determined by the increased value of the GCCC, the MS proceeds to step 1707 and updates at least one S-SFH/SPx determined through the SP change bitmap. In other words, the MS receives the changed at least one S-SFH/SPx, and updates stored information using the received at least one S-SFH/SPx.

On the other hand, if the number of the changed S-SFH/SPx determined from the SP change bitmap is not the same as the number of the changed S-SFH/SPx determined by the increased value of the GCCC, this means that it cannot be determined if any S-SFH/SPx is changed. Thus, in step 1709, the MS receives all S-SFH/SPx and then, updates stored information using the newly received S-SFH/SPx. For example, it may not be possible to determine if any S-SFH/SPx is changed because of entry of an idle mode or a sleep mode by the MS.

If the SP change bitmap is not changed in step 1701, this means that the S-SFH/SP1 is changed. Thus, in step 1711, the MS receives the S-SFH/SP1, and attempts to decode the S-SFH/SP1. That is, the MS extracts a signal of the S-SFH/

SP1 depending on a frame structure and, by demodulating, converts the signal into a bit stream. Then, the MS proceeds to step 1713 and determines a success or failure of the decoding for the S-SFH/SP1. In other words, the MS performs a CRC for the bit stream. If the decoding of the S-SFH/SP1 fails, the MS proceeds to step 1715 and waits until a next time for S-SFH/SP1 transmission. The MS then returns to step 1711. On the other hand, if the decoding of the S-SFH/SP1 is successful, the MS proceeds to step 1717 and updates a stored S-SFH/SP1 by the decoded S-SFH/SP1.

In the exemplary embodiments described with reference to FIGS. 16 and 17, if one bit per S-SFH/SPx is allocated, when an S-SFH/SPx is changed while an MS is in an idle mode or sleep mode, the MS cannot be aware of a change or non-change of the S-SFH/SPx. This is because a corresponding bit is set to '1' at the time of a change of the S-SFH/SPx and then, returns to '0'. Thus, there may be circumstances in which, if the MS is out of the idle mode or sleep mode and recognizes that a GCCC increases, the MS has to again acquire an S-SFH/SP1 and all S-SFH/SPx. On the other hand, if using an 'N' bit per S-SFH/SPx, the MS may be aware of a history of a change of an S-SFH/SPx generated while being in the idle mode or sleep mode, but a relatively large amount of resources is consumed.

In a broadband wireless communication system according to the an exemplary embodiment of the present invention, in order to reduce number of SP change counters, an exemplary embodiment the present invention proposes a scheme of setting a number of SP change counters one less than a number of S-SFH/SPx. For example, if two common control messages such as an S-SFH/SP2, an S-SFH/SP3, etc. exist, a P-SFH includes only a GCCC, and an S-SFH/SP1 includes only an SP change counter for the S-SFH/SP2. Thus, a change or non-change of the S-SFH/SP1 is determined by an upper layer depending on if there is a change in an existing parameter after decoding the S-SFH/SP1. Thus, an MS may determine a change or non-change of an S-SFH/SP3 by reading a GCCC and an S-SFH/SP2 change counter and then reading a real change or non-change of S-SFH/1P1 information. In this case, a detailed operation of the MS is described below with reference to FIG. 18.

Figure 18:
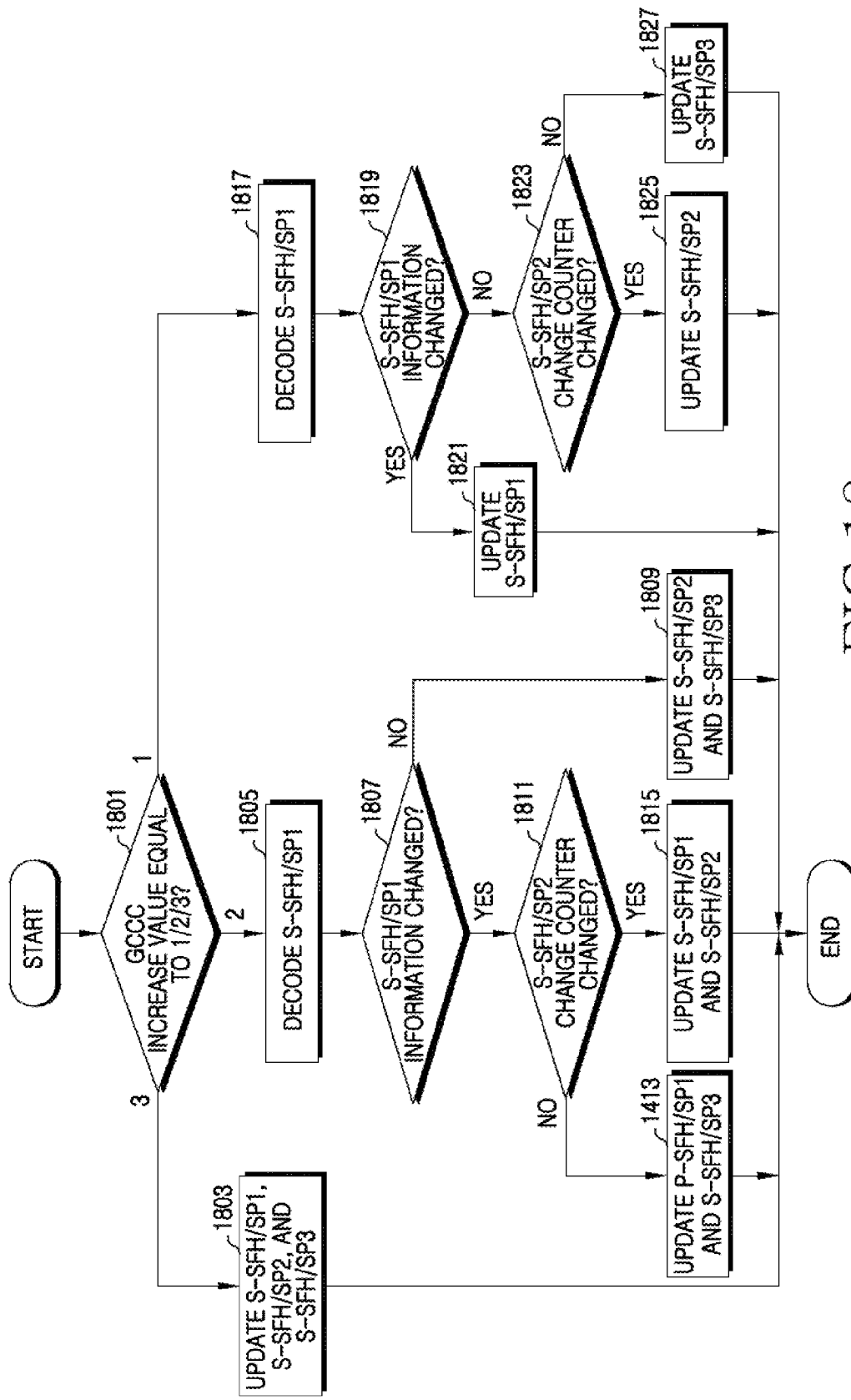
FIG. 18 is a flowchart illustrating operation procedures of an MS when a number of change counters is one less than a total number of common control messages in a broadband wireless communication system according to an exemplary embodiment of the present invention.

FIG. 18 illustrates an operation procedure of an MS when a number of change counters is one less than a total number of common control messages in a broadband wireless communication system according to an exemplary embodiment of the present invention. In FIG. 18, it is assumed that two common control messages such as an S-SFH/SP2, an S-SFH/SP3, etc. are used.

Referring to FIG. 18, in step 1801, the MS determines a change value of a GCCC. If the change value of the GCCC is equal to '3', the MS proceeds to step 1803. If the change value is equal to '2', the MS proceeds to step 1805. If the change value is equal to '1', the MS proceeds to step 1817.

If the change value of the GCCC is equal to '3', the MS proceeds to step 1803 and determines that an S-SFH/SP1, an S-SFH/SP2, and an S-SFH/SP3 are all changed. Thus, the MS receives and updates each of the S-SFH/SP1, the S-SFH/SP2, and the S-SFH/SP3.

If the change value of the GCCC is equal to '2', the MS proceeds to step 1805 and decodes the S-SFH/SP1. Then, the MS proceeds to step 1807 and determines a change or non-change of the S-SFH/SP1. If information other than an S-SFH/SP2 change counter within the S-SFH/SP1 is not changed, in step 1809, the MS determines that the S-SFH/SP2 and the S-SFH/SP3 are changed, and receives and updates the S-SFH/SP2 and the S-SFH/SP3. On the other hand, if the S-SFH/SP1 is changed, the MS proceeds to step 1811 and determines a change or non-change of an S-SFH/SP2 change counter. If the S-SFH/SP2 change counter is not changed, in step 1813, the MS determines that the S-SFH/SP1 and the S-SFH/SP3 are changed, and receives and updates the S-SFH/SP1 and the S-SFH/SP3. On the other hand, if the S-SFH/SP2 change counter increases, in step 1815, the MS determines that the S-SFH/SP1 and the S-SFH/SP2 are changed, and receives and updates the S-SFH/SP1 and the S-SFH/SP2.

If the change value of the GCCC is equal to '1', the MS proceeds to step 1817 and decodes the S-SFH/SP1. Then, the MS proceeds to step 1819 and determines a change or non-change of the S-SFH/SP1. If the S-SFH/SP1 is changed, in step 1821, the MS determines that the S-SFH/SP1 is changed, and updates the S-SFH/SP1. On the other hand, if the S-SFH/SP1 is not changed, the MS proceeds to step 1823 and determines a change or non-change of an S-SFH/SP2 change counter. If the S-SFH/SP2 change counter value is changed, in step 1825, the MS determines that the S-SFH/SP2 is changed, and receives and updates the S-SFH/SP2. On the other hand, if the S-SFH/SP2 change counter is not changed, in step 1827, the MS determines that the S-SFH/SP3 is changed, and receives and updates the S-SFH/SP3.

The exemplary embodiment described with reference to FIG. 18 is an operation procedure of an MS continuously performing communication and decoding a P-SFH every super frame. If an MS is in an idle mode or sleep mode during any time, the MS does not continuously compare a change of information of an S-SFH/SP1 and thus, a procedure of analyzing a change counter is different from that of the MS continuously performing communication. Thus, a procedure of, if an MS is in an idle mode or sleep mode, determining a change or non-change of an S-SFH/SP1 and a common control message depending on a GCCC change according to an exemplary embodiment of the present invention is described below with reference to FIGS. 19A to 19C.

Figure 19A:
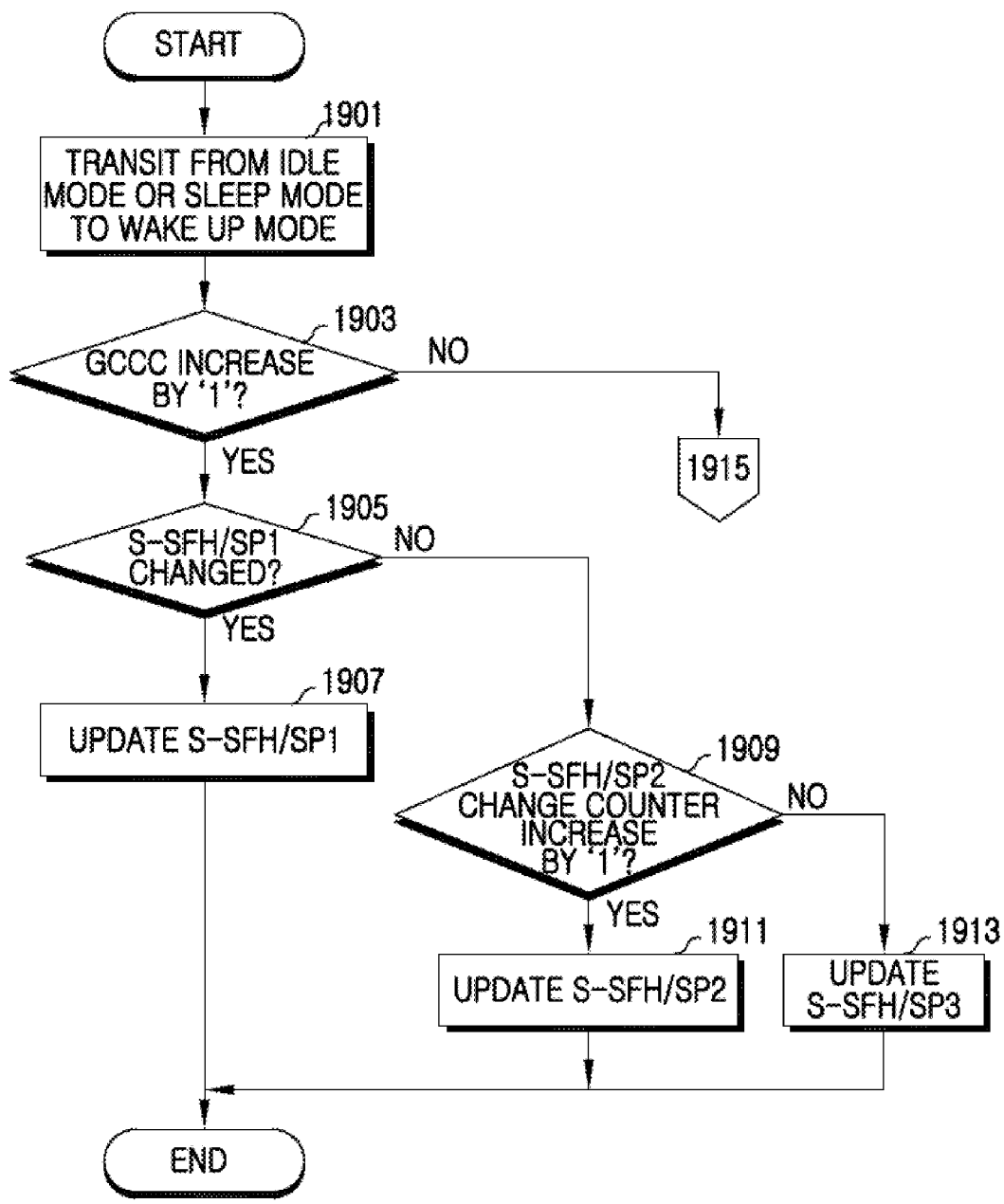
FIGS. 19A to 19C are flowcharts illustrating operation procedures of an MS transiting to an awake mode (i.e., a normal mode) from an idle mode or sleep mode in a broadband wireless communication system according to exemplary embodiments of the present invention.
Figure 19B:
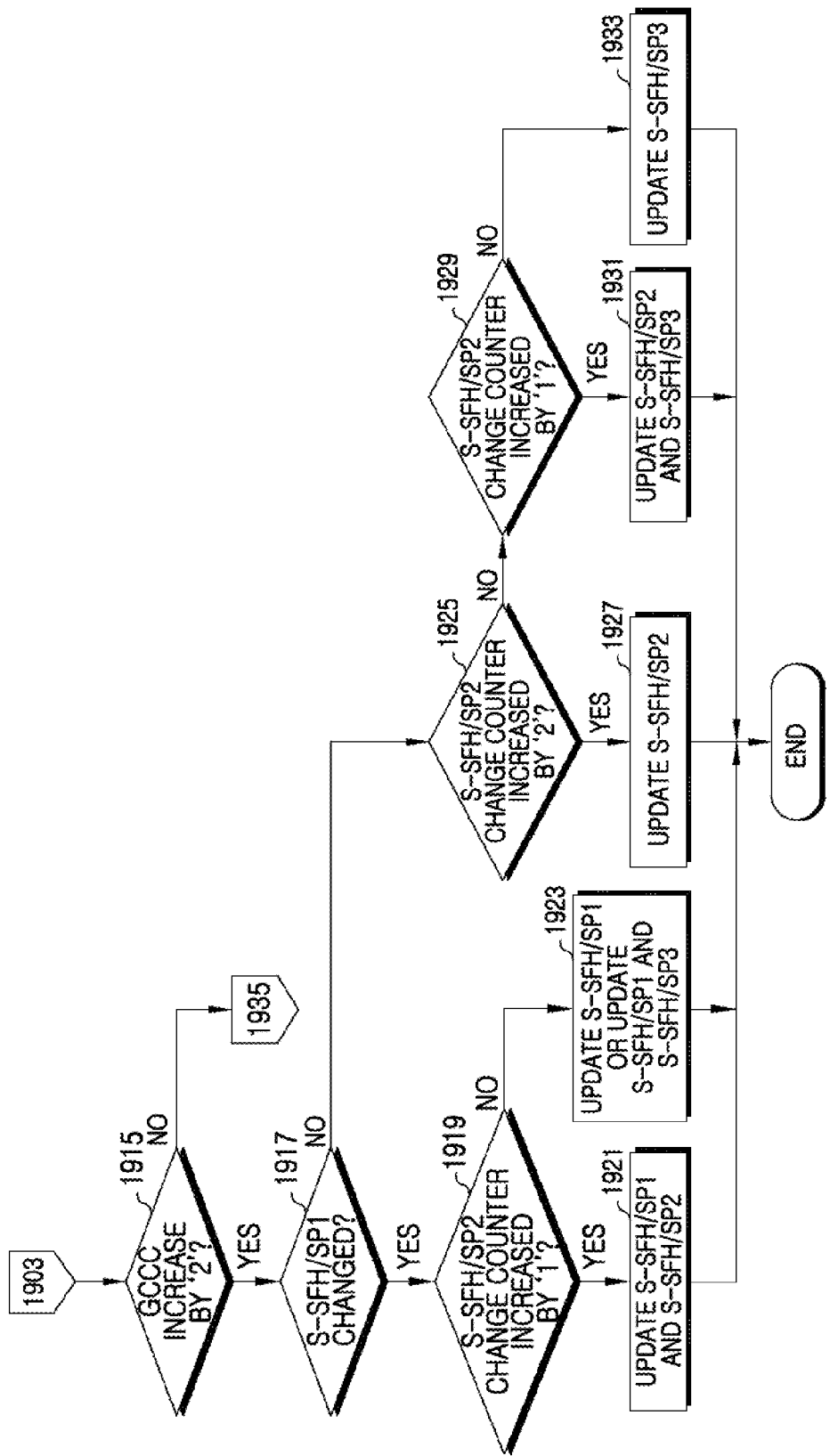
Figure 19C:
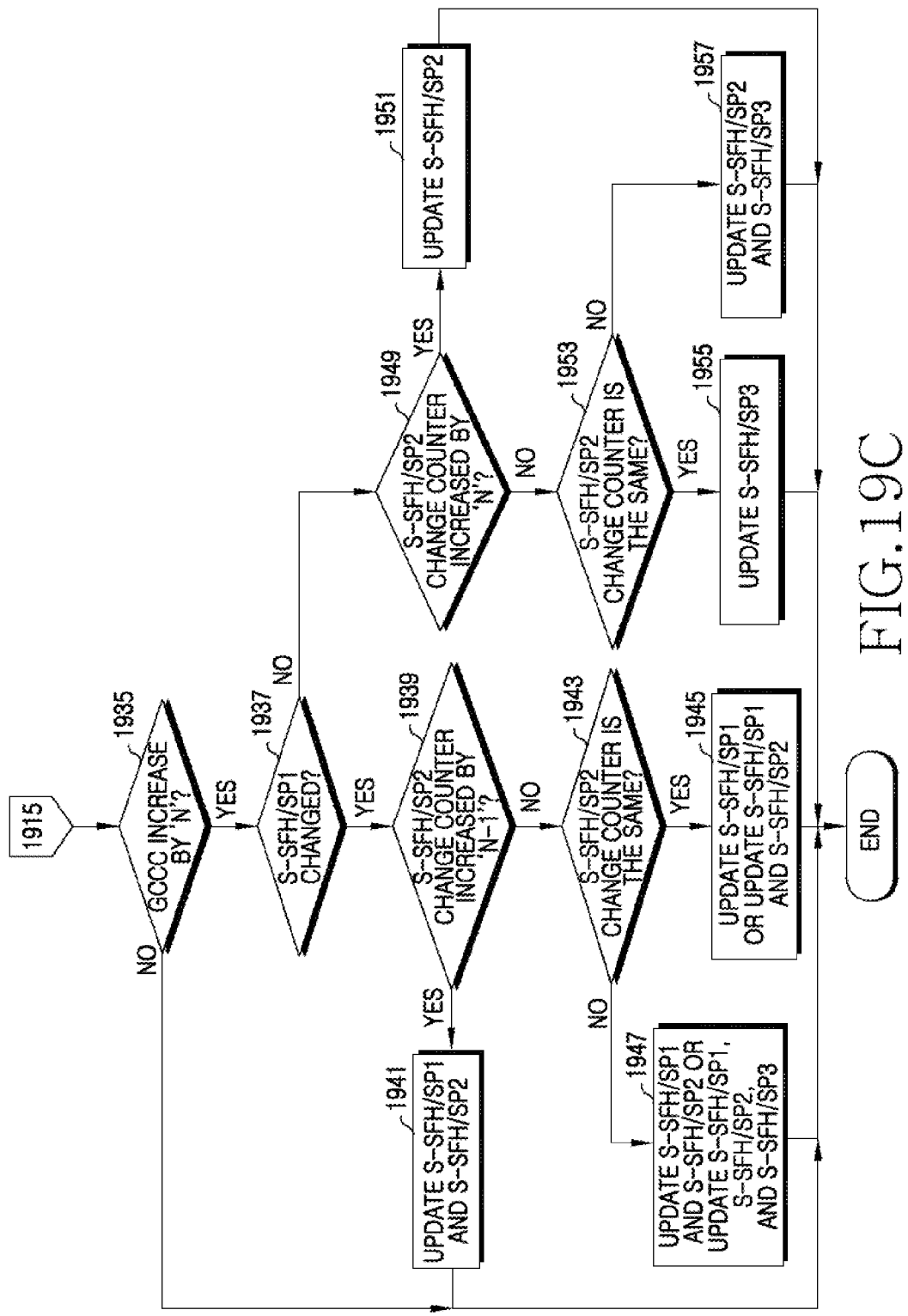

FIGS. 19A to 19C illustrate operation procedures of an MS transiting to an awake mode from an idle mode or sleep mode in a broadband wireless communication system according to exemplary embodiments of the present invention. FIGS. 19A to 19C illustrate procedures of determining a change or non-change of an S-SFH/SP1 and common control message depending on a change value of the GCCC when an MS being in an idle mode or sleep mode reads a GCCC.

Referring to FIGS. 19A to 19C, in step 1901, the MS transits from an idle mode or sleep mode to an awake mode to identify paging or non-paging.

Then, the MS proceeds to step 1903 and determines if a GCCC received through a P-SFH is changed compared to a previous one. If the GCCC is changed by '1', this means that one of an S-SFH/SP1, an S-SFH/SP2, and an S-SFH/SP3 is changed. Thus, if the GCCC is changed by '1', the MS proceeds to step 1905 and determines if the S-SFH/SP1 is changed. If the S-SFH/SP1 is changed, the MS proceeds to step 1907 and updates the S-SFH/SP1. On the other hand, if the S-SFH/SP1 is not changed in step 1905, the MS proceeds to step 1909 and determines if an S-SFH/SP2 change counter increases by '1'. If the S-SFH/SP2 change counter increases by '1', in step 1911, the MS determines that the S-SFH/SP2 is changed, and receives and updates the S-SFH/SP2. On the other hand, if the S-SFH/SP2 change counter does not increase, in step 1913, the MS determines that the S-SFH/SP3 is changed, and receives and updates the S-SFH/SP3.

Returning to step 1903, if the GCCC does not increase by '1', the MS proceeds to step 1915 (FIG. 19B) and determines if the GCCC increases by '2'. Referring to FIG. 19B, if the GCCC increases by '2', the MS proceeds to step 1917 and determines if the S-SFH/SP1 is changed. If the S-SFH/SP1 is changed, the MS proceeds to step 1919 and determines if the S-SFH/SP2 change counter increases by '1'. If the S-SFH/SP2 change counter increases by '1', in step 1921, the MS determines that the S-SFH/SP1 and S-SFH/SP2 are changed, and receives and updates the S-SFH/SP1 and S-SFH/SP2. On the other hand, if the S-SFH/SP2 change counter does not increase, the MS proceeds to step 1923. If the S-SFH/SP1 is changed and the S-SFH/SP2 does not increase, the MS cannot determine if the S-SFH/SP1 is changed twice or if the S-SFH/SP1 and the S-SFH/SP3 are changed once. Thus, in step 1923, the MS receives the S-SFH/SP3, determines a change or non-change of the S-SFH/SP3, and updates only the S-SFH/SP1 or updates all of the S-SFH/SP1 and the S-SFH/SP3 depending on the determination result.

Returning to step 1917, if the S-SFH/SP1 is not changed, the MS proceeds to step 1925 and determines if the S-SFH/SP2 change counter increases by '2'. If the S-SFH/SP2 change counter increases by '2', in step 1927, the MS determines that only the S-SFH/SP2 is changed, and receives and updates the S-SFH/SP2. On the other hand, if the S-SFH/SP2 change counter does not increase by '2', the MS proceeds to step 1929 and determines if the S-SFH/SP2 change counter increases by '1'. If the S-SFH/SP2 change counter increases by '1', in step 1931, the MS determines that the S-SFH/SP2 and S-SFH/SP3 are changed, and receives and updates the S-SFH/SP2 and S-SFH/SP3. On the other hand, if the S-SFH/SP2 change counter does not increase, in step 1933, the MS determines that only the S-SFH/SP3 is changed, and receives and updates the S-SFH/SP3.

Returning to step 1915, if the GCCC does not increase by '2', the MS proceeds to step 1935 (FIG. 19C). Referring to FIG. 19C, in step 1935, the MS determines if the GCCC increases by 'N'. Here, the 'N' represents an integer of '3' or more. If the GCCC increases by 'N', the MS proceeds to step 1937 and determines if the S-SFH/SP1 is changed. If the S-SFH/SP1 is changed, the MS proceeds to step 1939 and determines if the S-SFH/SP2 change counter increases by 'N−1'. If the S-SFH/SP2 change counter increases by 'N−1', in step 1941, the MS determines that the S-SFH/SP1 and S-SFH/SP2 are changed, and receives and updates the S-SFH/SP1 and S-SFH/SP2. On the other hand, if the S-SFH/SP2 change counter does not increase by 'N−1' in step 1939, the MS proceeds to step 1943 and determines if the S-SFH/SP2 change counter is the same. If the S-SFH/SP2 change counter is the same, this means that only the S-SFH/SP1 is changed or the S-SFH/SP1 and S-SFH/SP3 are changed. In this case, in step 1945, the MS receives the S-SFH/SP3, determines a change or non-change of the S-SFH/SP3, and updates only the S-SFH/SP1 or updates the S-SFH/SP1 and S-SFH/SP3 depending on the determination result. On the other hand, if the S-SFH/SP2 change counter is not the same in step 1943, that is, if the S-SFH/SP2 change counter increases by '1' or 'N−2', this means that the S-SFH/SP1 and S-SFH/SP2 are changed or means that the S-SFH/SP1, S-SFH/SP2, and S-SFH/SP3 are all changed. In this case, in step 1947, the MS receives the S-SFH/SP3, determines a change or non-change of the S-SFH/SP3, and updates the S-SFH/SP1 and S-SFH/SP2 or updates all of the S-SFH/SP1, S-SFH/SP2 and S-SFH/SP3 depending on the determination result.

Returning to step 1937, if the S-SFH/SP1 is not changed, the MS proceeds to step 1949 and determines if the S-SFH/SP2 change counter increases by 'N'. If the S-SFH/SP2 change counter increases by 'N', in step 1951, the MS determines that only the S-SFH/SP2 is changed, and receives and updates the S-SFH/SP2. On the other hand, if the S-SFH/SP2 change counter does not increase by 'N' in step 1949, the MS proceeds to step 1953 and determines if the S-SFH/SP2 change counter is the same. If the S-SFH/SP2 change counter is the same, in step 1955, the MS determines that only the S-SFH/SP3 is changed, and receives and updates the S-SFH/SP3. On the other hand, if the S-SFH/SP2 change counter is not the same in step 1953, that is, if the S-SFH/SP2 change counter increases by '1' or 'N−1', in step 1957, the MS determines that the S-SFH/SP2 and S-SFH/SP3 are changed, and receives and updates the S-SFH/SP2 and S-SFH/SP3.

A difficulty of determining a change or non-change of an S-SFH/SP3 occurs in step 1923, step 1945, and step 1947 among the exemplary embodiments described with reference to FIGS. 19A to 19C. Thus, in the aforementioned exemplary embodiment of the present invention, when it is difficult to determine a change or non-change of an S-SFH/SP3, the MS determines a direct change or non-change by receiving the S-SFH/SP3. However, as described with reference to FIG. 4, if an S-SFH/SP3 includes information not influencing actual data transmission/reception, an MS may perform communication although not acquiring information included in the S-SFH/SP3. Thus, according to another exemplary embodiment of the present invention of determining a change or non-change of an S-SFH/SP3, when it is difficult to determine the change or non-change of the S-SFH/SP3, an MS may determine that the S-SFH/SP3 is not changed. This is because actually changing common control information several times during operation in an idle mode or sleep mode is limited and thus, is not a fatal problem to a system, although it is determined that the S-SFH/SP3 is not changed.

Figure 20:
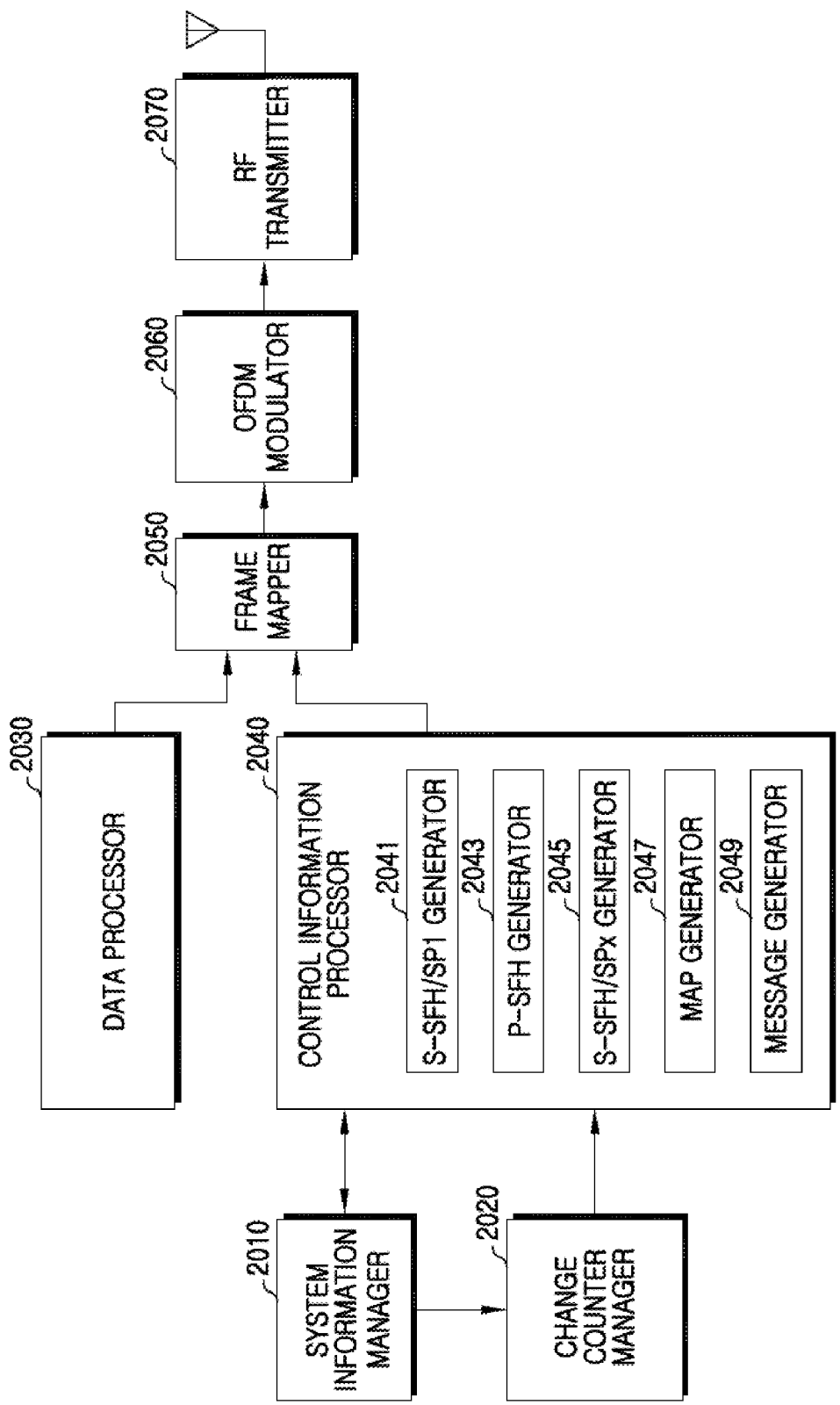
FIG. 20 is a block diagram illustrating a construction of a BS in a broadband wireless communication system according to an exemplary embodiment of the present invention.

FIG. 20 illustrates a construction of a BS in a broadband wireless communication system according to an exemplary embodiment of the present invention.

Referring to FIG. 20, the BS includes a system information manager 2010, a change counter manager 2020, a data processor 2030, a control information processor 2040, a frame mapper 2050, an OFDM modulator 2060, and an RF transmitter 2070.

The system information manager 2010 stores and manages system control information necessary for an MS to access the BS. If system control information transmission is required, the system information manager 2010 provides stored system control information to the control information processor 2040. In addition, if the stored system control information is changed, the system information manager 2010 notifies the change counter manager 2020 of a change of the system control information.

The change counter manager 2020 stores and manages at least one of a GCCC, SP change counters, and an SP change bitmap for informing an MS of the change of the system control information. That is, the change counter manager 2020 sets at least one of the GCCC, the SP change counters, and the SP change bitmap depending on the change of the system control information notified from the system information manager 2010. Thus, if the change of the system control information is notified from the system information manager 2010, the change counter manager 2020 determines if the changed system control information is transmitted through an S-SFH/SP1 or is transmitted through an S-SFH/SP1. If the changed system control information is transmitted through the S-SFH/SPx, the change counter manager 2020 increases the GCCC. On the other hand, if the changed system control information is transmitted through the S-SFH/SPx, the change counter manager 2020 increases the SP change counter corresponding to the changed S-SFH/SPx, or changes the SP change bitmap.

An operation of changing the SP change bitmap is described below. If an SP change bitmap allocated one bit per S-SFH/SPx is used, the change counter manager 2020 initializes the whole SP change bitmap to '0' and then, sets a bit corresponding to a changed at least one S-SFH/SPx to '1'. That is, when each bit of the SP change bitmap corresponds to each S-SFH/SPx, if a specific S-SFH/SPx is changed, the change counter manager 2020 sets a corresponding bit to '1' and, if no change, sets the corresponding bit to '0'. On the other hand, if an SP change bitmap allocated a plurality of bits per S-SFH/SPx is used, the change counter manager 2020 increases bits of an 'N (>1)' number corresponding to a changed at least one S-SFH/SPx by a predefined value.

The data processor 2030 generates a data signal to be transmitted to an MS. That is, the data processor 2030 converts a data bit stream to be transmitted to the MS into complex symbols by encoding and modulating. The data processor 2030 provides the complex symbols to the frame mapper 2050. The control information processor 2040 generates a control signal to be transmitted to the MS. That is, the control information processor 2040 configures control information to be transmitted to the MS, and converts the control information into complex symbols by encoding and modulating. The control information processor 2040 provides the complex symbols to the frame mapper 2050. The control information processor 2040 includes an S-SFH/SP1 generator 2041, a P-SFH generator 2043, an S-SFH/SPx generator 2045, a map generator 2047, and a message generator 2049.

The S-SFH/SP1 generator 2041 generates an S-SFH/SP1 including information transmitted in a period of one or more super frame units among system control information provided from the system information manager 2010. At this time, the S-SFH/SP1 generator 2041 generates an S-SFH/SP1 depending on a set S-SFH/SP1 transmission period. The S-SFH/SP1 transmission period may be set to a value of one or more super frames. More particularly, according to a first exemplary embodiment of the present invention, the S-SFH/SP1 generator 2041 generates an S-SFH/SP1 including an SP change counter or an SP change bitmap. In other words, the generator 2041 generates an S-SFH/SP1 including at least one SP change counter or SP change bitmap provided from the change counter manager 2020.

The P-SFH generator 2043 generates a P-SFH including information not changed among system control information provided from the system information manager 2010. At this time, the P-SFH generator 2043 generates a P-SFH at an interval of transmitting a super-frame header every super frame. More particularly, according to an exemplary embodiment of the present invention, the P-SFH generator 2043 generates a P-SFH including a GCCC. In other words, the P-SFH generator 2043 generates a P-SFH including the GCCC provided from the change counter manager 2020.

The S-SFH/SPx generator 2045 generates a common control message, i.e., an S-SFH/SPx transmitted through a data region. At this time, upon transmission of a super-frame header not including an S-SFH/SP1 or when it is determined that transmission of an S-SFH/SPx is necessary, the S-SFH/SPx generator 2045 generates the S-SFH/SPx. The map generator 2047 generates a map for informing an MS of resource allocation information. More particularly, according to a second exemplary embodiment of the present invention, the map generator 2047 generates a change counter map including an SP change counter or SP change bitmap. In this case, the map generator 2047 scrambles the change counter map by a scrambling code particular to the change counter map. Alternatively, the map generator 2047 inserts, in the change counter map, a parameter that identifies the change counter map.

The message generator 2049 generates a control message to be transmitted to an MS through a data region. More particularly, according to a third exemplary embodiment of the present invention, the message generator 2049 generates a change counter burst including an SP change counter or an SP change bitmap.

The frame mapper 2050 maps the complex symbols provided from the data processor 2030 and the control information processor 2040 to a resource depending on a frame structure. That is, the frame mapper 2050 maps the S-SFH/SP1 and the P-SFH to a super-frame header, maps part of the S-SFH/SPx to a super-frame header, and maps a remainder to a data region. At this time, within the super-frame header, multiplexing of the P-SFH and the S-SFH/SP1 and multiplexing of the P-SFH and the S-SFH/SPx have a form of time division or frequency division. The OFDM modulator 2060 converts frequency-domain signals provided from the frame mapper 2050 into time-domain signals through IFFT operation, and configures OFDM symbols by inserting a CP. The RF transmitter 2070 converts baseband OFDM symbols provided from the OFDM modulator 2060 into an RF band signal and then transmits the RF band signal through an antenna.

Figure 21:
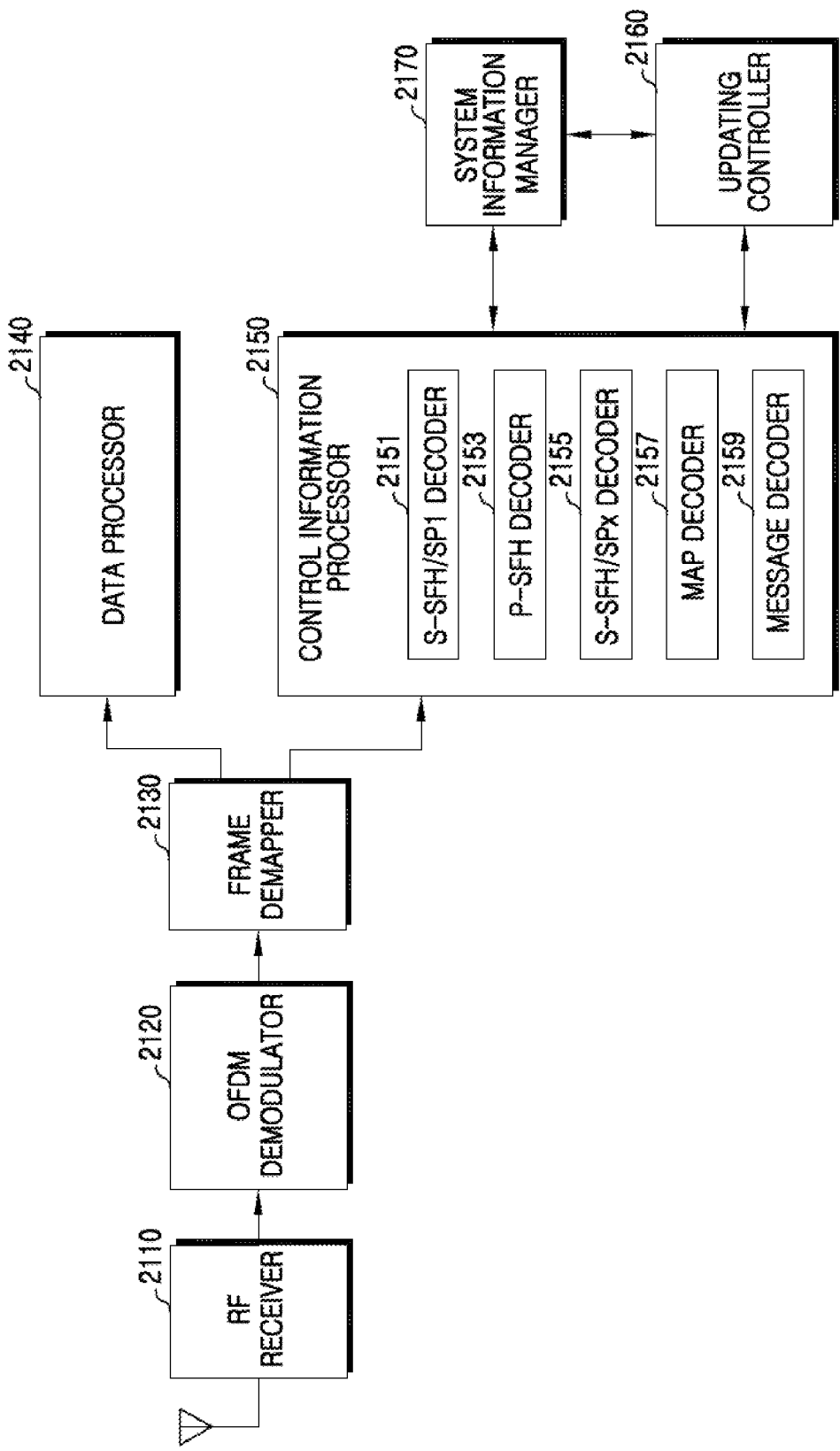
FIG. 21 is a block diagram illustrating a construction of an MS in a broadband wireless communication system according to an exemplary embodiment of the present invention.

FIG. 21 illustrates a construction of an MS in a broadband wireless communication system according to an exemplary embodiment of the present invention.

Referring to FIG. 21, the MS includes an RF receiver 2110, an OFDM demodulator 2120, a frame demapper 2130, a data processor 2140, a control information processor 2150, an updating controller 2160, and a system information manager 2170.

The RF receiver 2110 down-converts an RF band signal received through an antenna into a baseband signal. The OFDM demodulator 2120 distinguishes the baseband signal provided from the RF receiver 2110 in an OFDM symbol unit and, after eliminating a CP, restores frequency-domain signals through Fast Fourier Transform (FFT) operation. The frame demapper 2130 distinguishes the frequency-domain signals provided from the OFDM demodulator 2120 in a processing unit. For example, the frame demapper 2130 provides data signals received through a data region to the data processor 2140, and provides control signals received through a control region or a data region such as a super-frame header, etc. to the control information processor 2150.

The data processor 2140 restores the data signal provided from the frame demapper 2130 to a data bit stream. That is, the data processor 2140 converts the data signal into a data bit stream by demodulating and decoding.

The control information processor 2150 restores and reads control information from a control signal provided from the frame demapper 2130. That is, the control information processor 2150 restores the control information by demodulating and decoding the control signal. The control information processor 2150 includes an S-SFH/SP1 decoder 2151, a P-SFH decoder 2153, an S-SFH/SPx decoder 2155, a map decoder 2157, and a message decoder 2159.

The S-SFH/SP1 decoder 2151 restores system control information not frequently changed among system control information by decoding a signal of an S-SFH/SP1 under control of the updating controller 2160. More particularly, according to a first exemplary embodiment of the present invention, the S-SFH/SP1 decoder 2151 reads an SP change counter or SP change bitmap included in the S-SFH/SP1. The S-SFH/SP1 decoder 2151 provides the SP change counter or the SP change bitmap to the updating controller 2160.

The P-SFH decoder 2153 restores system control information not changed by decoding a signal of a P-SFH under control of the updating controller 2160. More particularly, according to an exemplary embodiment of the present invention, the P-SFH decoder 2153 reads a GCCC included in the P-SFH. The P-SFH decoder 2153 provides the GCCC to the updating controller 2160. The S-SFH/SPx decoder 2155 restores system control information by decoding a common control message, i.e., an S-SFH/SPx received through a data region.

The map decoder 2157 restores resource allocation information by decoding a map. More particularly, according to a second exemplary embodiment of the present invention, the map decoder 2157 reads the SP change counter or SP change bit map included in a change counter map. In this case, the map decoder 2157 descrambles the change counter map by a scrambling code particular to the change counter map. Alternatively, the map decoder 2157 identifies the change counter map among a plurality of maps using a parameter that identifies the change counter map.

The message decoder 2159 decodes a control message received through a data region. More particularly, according to a third exemplary embodiment of the present invention, the message analyzer 2159 reads the SP change counter or the SP change bitmap by decoding a change counter burst including the SP change counter.

The updating controller 2160 determines a change or non-change of an S-SFH/SP1 or an S-SFH/SPx using a GCCC and at least one SP change counter provided from the control information processor 2150. That is, if it is determined that the GCCC increases, the updating controller 2160 determines that at least one of the or S-SFH/SPx is changed, and reads SP change counters or an SP change bitmap. If it is determined that the at least one SP change counter increases or the SP change bitmap is changed, the updating controller 2160 identifies a changed S-SFH/SPx, controls the S-SFH/SPx decoder 2155 to decode the changed S-SFH/SPx, and controls the system information manager 2170 to update a stored corresponding S-SFH/SPx by the S-SFH/SPx decoded by the S-SFH/SPx decoder 2155. On the other hand, if it is determined that all SP change counters do not increase or the SP change bitmap is not changed, the updating controller 2160 determines that an S-SFH/SP1 is changed, controls the S-SFH/SP1 decoder 2151 to decode the S-SFH/SP1, and controls the system information manager 2170 to update a stored corresponding S-SFH/SP1 by the S-SFH/SP1 decoded by the S-SFH/SP1 decoder 2151.

If the SP change bitmap is used, the updating controller 2160 determines if number of changed S-SFH/SPx determined from the SP change bitmap is the same as number of changed S-SFH/SPx determined by an increase value of the GCCC. For example, when assuming that the GCCC increases by '1' according to a change of one of an S-SFH/SPx and an S-SFH/SP1, if the S-SFH/SP1 is not changed, the MS determines if the number of the changed S-SFH/SPx determined from the SP change bitmap is the same as the increased value of the GCCC. If the S-SFH/SP1 is changed, the MS determines if the number of the changed S-SFH/SPx determined from the SP change bitmap is '1' less than the increased value of the GCCC. If the number of the changed S-SFH/SPx determined from the SP change bitmap is the same as the number of the changed S-SFH/SPx determined by the increased value of the GCCC, the updating controller 2160 updates at least one S-SFH/SPx determined through the SP change bitmap. On the other hand, if the number of the changed S-SFH/SPx determined from the SP change bitmap is not the same as the number of the changed S-SFH/SPx determined by the increased value of the GCCC, the updating controller 2160 receives all S-SFH/SPx and then updates stored information using the newly received S-SFH/SPx.

The system information manager 2170 stores and manages system control information necessary for accessing a BS. More particularly, the system information manager 2170 updates stored system control information under control of the updating controller 2160. That is, if updating of system control information is indicated from the updating controller 2160, the system information manager 2170 updates stored system control information by system control information provided from the control information processor 2150.

In a broadband wireless communication system, exemplary embodiments of the present invention may reduce an overhead of information transmitted through a common control channel by setting a GCCC that is representative of a P-SFH, an S-SFH/SP1 message, and a separate common control message and using a separate change counter corresponding to each common control message.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operation method of a Base Station (BS) in a wireless communication system, the method comprising:
   changing a Group Configuration Change Counter (GCCC) upon change of information in a Secondary-Super Frame Header/Sub-Packet1 (S-SFH/SP1) whose transmission period is changeable within a range of one or more super frames;
   changing the GCCC and information representing a change of information in a common control message upon a change of at least one common control message;
   generating a Primary-Super Frame Header (P-SFH) which comprises the GCCC and the information representing the change of information in the at least one common control message, and which is transmitted every frame; and
   transmitting the P-SFH,
   wherein the information representing the change of the information in the common control message comprises one of a plurality of counters each corresponding to common control messages, and a bitmap which comprises at least one bit corresponding to one common control message.

2. The method of claim 1, wherein the transmitting of the GCCC and the information representing the change of the information in the common control message comprises:
   generating an S-SFH/SP1 which comprises the information representing the change of the information in the at least one common control message; and
   transmitting the S-SFH/SP1.

3. The method of claim 1, wherein the transmitting of the GCCC and the information representing the change of the information in the common control message comprises:
   generating a change counter map which comprises the information representing the change of the information in the at least one common control message; and
   transmitting the change counter map.

4. The method of claim 3, wherein the generating of the change counter map comprises scrambling the change counter map by a scrambling code particular to the change counter map.

5. The method of claim 3, wherein the generating of the change counter map comprises inserting, in the change counter map, a parameter that identifies the change counter map.

6. The method of claim 1, wherein the transmitting of the GCCC and the information representing the change of the information in the common control message comprises:
- generating a burst which comprises the information representing the change of the information in the at least one common control message;
- generating a map which comprises resource allocation information of the burst; and
- transmitting the map and the burst.

7. The method of claim 1, wherein one bit within the bitmap corresponds to one common control message, and
- wherein changing of the information representing the change of the information in the common control message comprises:
- initializing a value of the bitmap to '0'; and
- setting at least one bit, corresponding to the at least one common control message among bits comprised in the bitmap, to '1'.

8. The method of claim 1, wherein a bit stream comprised of a plurality of bits within the bitmap corresponds to one common control message, and
- wherein changing of the information representing the change of the information in the common control message comprises increasing a value of at least one bit stream corresponding to the at least one common control message among bit streams comprised in the bitmap, by a predefined value.

9. An operation method of a Mobile Station (MS) in a wireless communication system, the method comprising:
- receiving a Primary-Super Frame Header (P-SFH), from a Base Station (BS), which comprises a Group Configuration Change Counter (GCCC) and information representing a change of at least one common control message, and which is transmitted every frame;
- reading the GCCC comprised in the P-SFH;
- determining a change or non-change of information in a Secondary-Super Frame Header/Sub-Packet1 (S-SFH/SP1) whose transmission period is changeable within a range of one or more super frames and information in at least one of common control messages, using the GCCC;
- determining a change or non-change of the information in at least one of the common control messages using the information representing a change of at least one common control message when the GCCC increases; and
- updating the information in the at least one common control message when at least one of the common control messages is changed,
wherein the information representing the change of the information in the common control message comprises one of a plurality of counters each corresponding to common control messages, and a bitmap which comprises at least one bit corresponding to one common control message.

10. The method of claim 9, wherein the determining of the change or non-change of the information in the at least one of the common control messages comprises:
- receiving the S-SFH/SP1 from the BS; and
- reading the information representing the change of the information in the common control message comprised in the S-SFH/SP1.

11. The method of claim 9, wherein the determining of the change or non-change of the information in at least one of the common control messages comprises:
- receiving a change counter map from the BS; and
- reading the information representing the change of the information in the common control message comprised in the change counter map.

12. The method of claim 11, wherein the receiving of the change counter map comprises descrambling the change counter map by a scrambling code particular to the change counter map.

13. The method of claim 11, wherein the receiving of the change counter map comprises identifying the change counter map using a parameter that identifies the change counter map.

14. The method of claim 9, wherein the determining of the change or non-change of the information in at least one of the common control messages comprises:
- reading resource allocation information of a burst which comprises the information representing the change of the information in the common control message through a map received from the BS;
- receiving a burst indicated by the resource allocation information; and
- reading the information representing the change of the information in the common control message comprised in the burst.

15. The method of claim 9, further comprising:
- when the GCCC is changed but the information representing the change of the information in the common control message is not changed, updating the S-SFH/SP1.

16. The method of claim 9, wherein the updating of the at least one common control message comprises, when a number of changed common control messages determined from the bitmap is the same as a number of changed common control messages determined by the GCCC, updating at least one common control message determined to be changed through the bitmap.

17. The method of claim 9, wherein the updating of the at least one common control message comprises, when a number of changed common control messages determined from the bitmap is not the same as a number of changed common control messages determined by the GCCC, updating all common control messages.

18. A Base Station (BS) apparatus in a wireless communication system, the apparatus comprising:
- a manager for changing a Group Configuration Change Counter (GCCC) upon change of information in a Secondary-Super Frame Header/Sub-Packet1 (S-SFH/SP1) whose transmission period is changeable within a range of one or more super frames, and for changing the GCCC and information representing a change of information in a common control message upon a change of information in at least one common control message;
- a Primary-Super Frame Header (P-SFH) generator for generating a P-SFH which comprises the GCCC and the information representing the change of the information in the at least one common control message, and which is transmitted every frame; and
- a transmitter for transmitting the P-SFH
wherein the information representing the change of the information in the common control message comprises one of a plurality of counters each corresponding to common control messages, and a bitmap which comprises at least one bit corresponding to one common control message.

19. The apparatus of claim 18, further comprising:
an S-SFH/SP1 generator for generating an S-SFH/SP1 which comprises the information representing the change of the information in the at least one common control message.

20. The apparatus of claim 18, further comprising:
a map generator for generating a change counter map which comprises the information representing the change of the information in the at least one common control message.

21. The apparatus of claim 20, wherein the map generator scrambles the change counter map by a scrambling code particular to the change counter map.

22. The apparatus of claim 20, wherein the map generator inserts, in the change counter map, a parameter that identifies the change counter map.

23. The apparatus of claim 18, further comprising:
a control message generator for generating a burst which comprises the information representing the change of the information in the at least one common control message;
a map generator for generating a map which comprises resource allocation information of the burst.

24. The apparatus of claim 18, wherein one bit within the bitmap corresponds to one common control message, and
wherein the manager initializes a value of the bitmap to '0' and then, sets at least one bit, corresponding to the at least one common control message among bits comprised in the bitmap, to '1'.

25. The apparatus of claim 18, wherein a bit stream comprised of a plurality of bits within the bitmap corresponds to one common control message, and
wherein the manager increases a value of at least one bit stream corresponding to the at least one common control message among bit streams comprised in the bitmap, by a predefined value.

26. A Mobile Station (MS) apparatus in a wireless communication system, the apparatus comprising:
a receiver for receiving, from a Base Station (BS), a Primary-Super Frame Header (P-SFH) which comprises a Group Configuration Change Counter (GCCC) and information representing a change of the information in at least one common control message, and which is transmitted every frame;
a P-SFH decoder for reading the GCCC comprised in the P-SFH;
a controller for determining a change or non-change of information in a Secondary-Super Frame Header/Sub-Packet1 (S-SFH/SP1) whose transmission period is changeable within a range of one or more super frames and information in at least one of common control messages using the GCCC, and for determining a change or non-change of information in at least one of the common control messages using the information representing a change of the information in at least one common control message when the GCCC is changed; and
a manager for updating the information in at least one common control message when at least one of the common control messages is changed,
wherein the information representing the change of the information in the common control message comprises one of a plurality of counters each corresponding to common control messages, and a bitmap which comprises at least one bit corresponding to one common control message.

27. The apparatus of claim 26, further comprising:
an S-SFH/SP1 decoder for reading the information representing the change of the information in the common control message comprised in the S-SFH/SP1.

28. The apparatus of claim 26, further comprising:
a map decoder for reading the information representing the change of the information in the common control message comprised in the change counter map received from the BS.

29. The apparatus of claim 28, wherein the map decoder descrambles the change counter map by a scrambling code particular to the change counter map.

30. The apparatus of claim 28, wherein the map decoder identifies the change counter map using a parameter that identifies the change counter map.

31. The apparatus of claim 26, further comprising:
a map decoder for reading resource allocation information of a burst which comprises the information representing the change of the information in the common control message through a map received from the BS;
a demapper for extracting a burst indicated by the resource allocation information; and
a message decoder for reading the information representing the change of the information in the common control message comprised in the burst.

32. The apparatus of claim 26, wherein, when the GCCC is changed but the information representing the change of the information in the common control message is not changed, the manager updates the S-SFH/SP1.

33. The apparatus of claim 26, wherein, when a number of changed common control messages determined from the bitmap is the same as a number of changed common control messages determined by the GCCC, the manager updates at least one common control message determined to be changed through the bitmap.

34. The apparatus of claim 26, wherein, when a number of changed common control messages determined from the bitmap is not the same as a number of changed common control messages determined by the GCCC, the manager updates all common control messages.

* * * * *